(12) United States Patent
Childers

(10) Patent No.: US 10,025,078 B2
(45) Date of Patent: Jul. 17, 2018

(54) METHOD AND SYSTEM FOR EMISSION OF AND CURING VIA NARROW WIDTH RADIATION

(71) Applicant: Phoseon Technology, Inc., Hillsboro, OR (US)

(72) Inventor: Doug Childers, Portland, OR (US)

(73) Assignee: Phoseon Technology, Inc., Hillsboro, OR (US)

(*) Notice: Subject to any disclaimer, the term of this patent is extended or adjusted under 35 U.S.C. 154(b) by 0 days.

(21) Appl. No.: 15/487,326

(22) Filed: Apr. 13, 2017

(65) Prior Publication Data

US 2017/0299850 A1 Oct. 19, 2017

Related U.S. Application Data

(60) Provisional application No. 62/323,474, filed on Apr. 15, 2016.

(51) Int. Cl.
*A61N 5/00* (2006.01)
*G02B 19/00* (2006.01)
*G02B 3/06* (2006.01)
*G02B 27/30* (2006.01)
*G21K 5/04* (2006.01)

(52) U.S. Cl.
CPC ......... *G02B 19/0009* (2013.01); *G02B 3/06* (2013.01); *G02B 27/30* (2013.01); *G21K 5/04* (2013.01)

(58) Field of Classification Search
CPC ............. G02B 19/00; G02B 19/0004; G02B 19/0014; G02B 19/0047; G02B 19/0061; G02B 19/0066; G02B 19/0095; G02B 19/0009; G02B 3/00; G02B 3/0068; (Continued)

(56) References Cited

U.S. PATENT DOCUMENTS 5,639,158 A 6/1997 Sato
6,061,486 A * 5/2000 Dobbs ................. G02B 6/32
385/147

(Continued)

FOREIGN PATENT DOCUMENTS

EP 2905605 A1 8/2015
KR 101558275 B1 10/2015
KR 1020150114268 A 10/2015

OTHER PUBLICATIONS

ISA Korean Intellectual Property Office, International Search Report and Written Opinion Issued in Application No. PCT/US2017/027495, dated Jul. 26, 2017, WIPO, 17 pages.

*Primary Examiner* — Jason McCormack
(74) *Attorney, Agent, or Firm* — McCoy Russell LLP

(57) ABSTRACT

An edge-curing device may comprise a cylindrical lens, a linear array of light-emitting elements, and an aperture, each aligned symmetrically about a longitudinal plane in a housing, wherein the cylindrical lens is positioned between the linear array of light-emitting elements and the aperture, the aperture spans the length of the cylindrical lens and is positioned directly adjacent to an emitting face of the cylindrical lens, and light emitted from the linear array of light-emitting elements and passing through the cylindrical lens is emitted from the emitting face and focused by the aperture within a beam width centered about the longitudinal plane.

19 Claims, 11 Drawing Sheets
(3 of 11 Drawing Sheet(s) Filed in Color)

(58) Field of Classification Search
CPC .......... G02B 3/0093; G02B 3/02; G02B 3/06; H01L 31/09; H01L 31/101; H01L 2224/81874
USPC ................. 250/492.1, 492.2, 492.22, 492.23
See application file for complete search history.

(56) References Cited

U.S. PATENT DOCUMENTS

| | | |
|---|---|---|
| 9,109,777 B2 | 8/2015 | Childers |
| 2006/0187653 A1 | 8/2006 | Olsson |
| 2010/0032585 A1* | 2/2010 | Caiger .................... B05D 3/067 250/492.1 |
| 2011/0147356 A1* | 6/2011 | Leonhardt ............. H05B 3/0057 219/201 |
| 2011/0290179 A1 | 12/2011 | Stowell et al. |
| 2013/0271970 A1* | 10/2013 | Childers ................. F21V 5/045 362/218 |
| 2017/0082861 A1* | 3/2017 | Xu ...................... G02B 27/0927 |

* cited by examiner

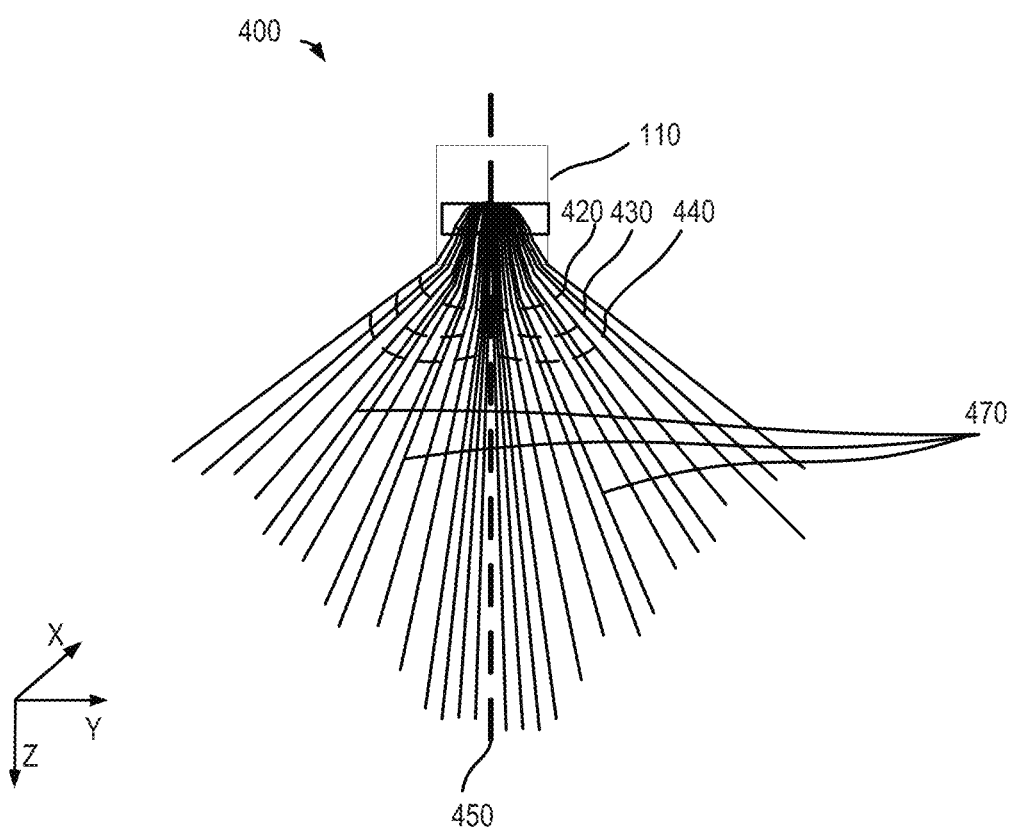

SECTION A-A

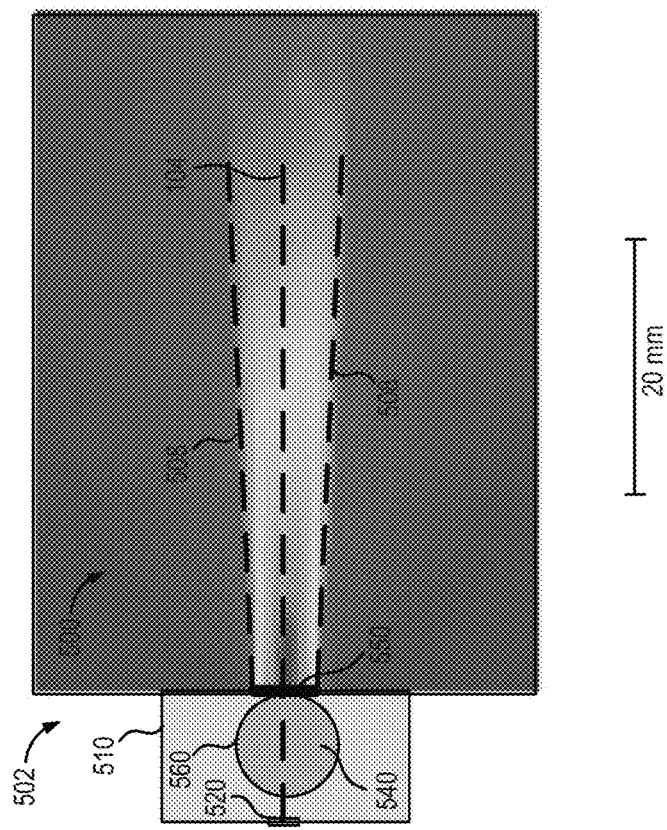
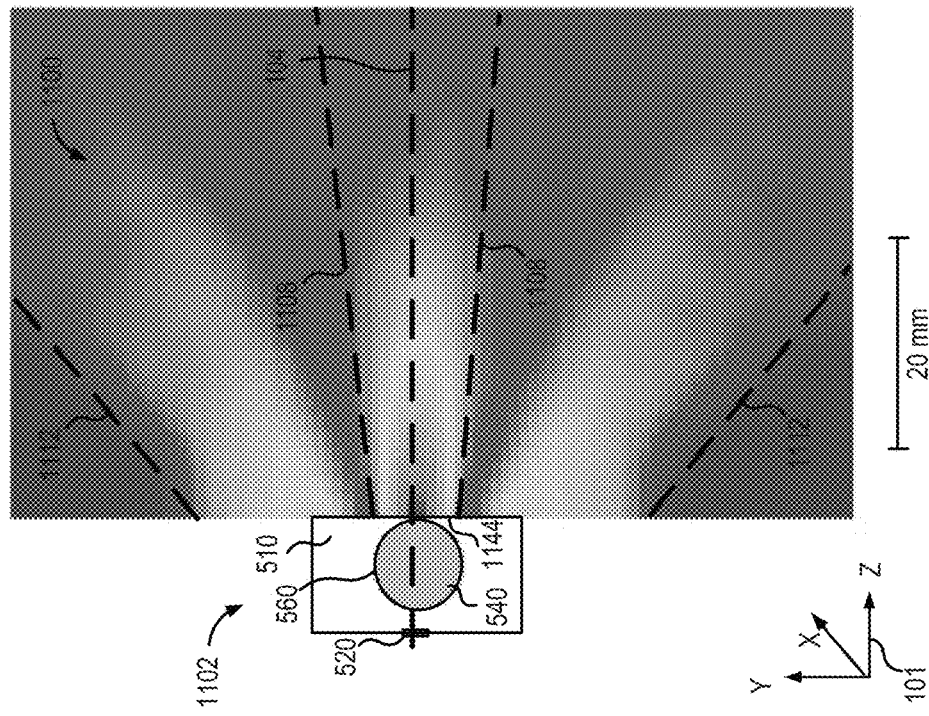
FIG. 11A
FIG. 11B

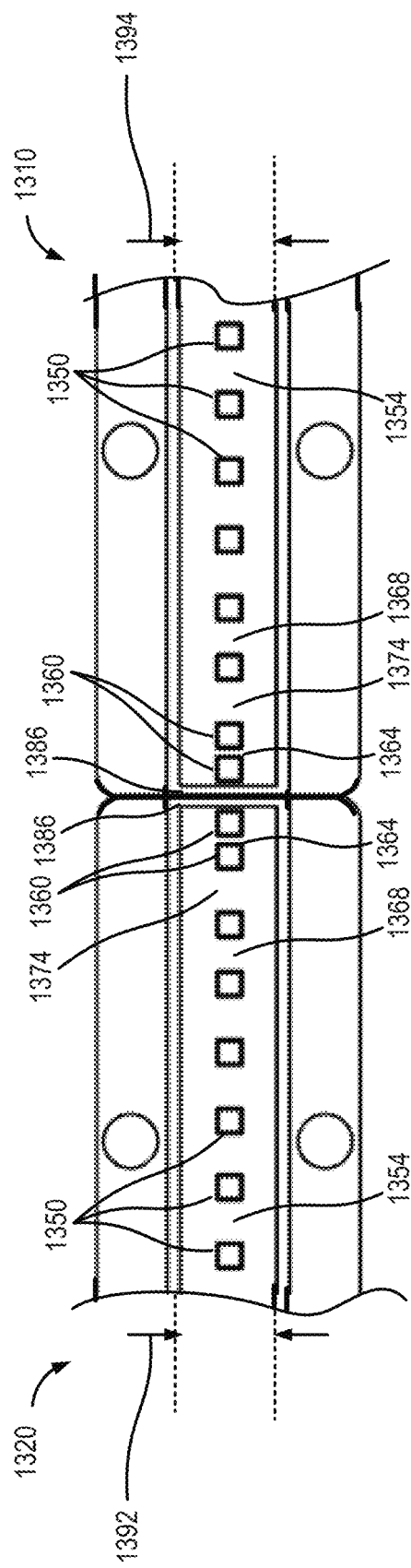

METHOD AND SYSTEM FOR EMISSION OF AND CURING VIA NARROW WIDTH RADIATION

CROSS REFERENCE TO RELATED APPLICATIONS

The present application claims priority to U.S. Provisional Application No. 62/323,474, entitled "METHOD AND SYSTEM FOR EMISSION OF AND CURING VIA NARROW WIDTH RADIATION," filed on Apr. 15, 2016, the entire contents of which are hereby incorporated by reference for all purposes.

BACKGROUND AND SUMMARY

Manufacture of devices such as modern displays employ photo active adhesives to cure layers of glass and other items together to form the display stack. Curing of photo active adhesives may be performed with conventional LED devices, both on the front of the device as an 'area' cure and on the sides of the device as an 'edge' cure. Key to the edge cure process is emitting a high enough irradiance over a narrow target beam width line to avoid 'over curing' of sensitive items outside of the target region. An example target region has a desired line width less than 3 mm at a working distance of 10 mm.

Childers (U.S. Pat. No. 9,109,777) describes a light source with a linear array of light-emitting elements aligned with and emitting light through a cylindrical lens, wherein the cylindrical lens reduces an angular spread of light in a widthwise axis of the linear array.

The inventors herein have recognized potential issues with the above approach. Namely, conventional LED devices are Lambertian emitters, and emit radiation over a broad target region with angular content in all directions. The emitted light from conventional LED devices quickly spreads out in a widthwise direction beyond a narrow width target region, within small distances proximal to the LEDs. Furthermore, although passing the light emitted from Lambertian emitters through a cylindrical lens aids in focusing and reducing the widthwise dispersion of emitted light, the light emitted from the cylindrical lens diverges beyond the bounds of the narrow beam width target. Thus, over curing beyond a target region of sensitive work pieces may not be substantially reduced.

One approach that at least partially addresses the above issues includes an edge-curing device, comprising a cylindrical lens, a linear array of light-emitting elements, and an aperture, each aligned symmetrically about a longitudinal plane in a housing, wherein the cylindrical lens is positioned between the linear array of light-emitting elements and the aperture, the aperture spans the length of the cylindrical lens and is positioned directly adjacent to an emitting face of the cylindrical lens, and light emitted from the linear array of light-emitting elements and passing through the cylindrical lens is emitted from the emitting face and focused by the aperture within a beam width centered about the longitudinal plane.

In another embodiment, a method of edge curing a workpiece may comprise aligning longitudinal axes of each of a linear array of light-emitting elements, a cylindrical lens, and an aperture on a longitudinal plane, receiving light from the linear array of light-emitting elements at an incident face of the cylindrical lens, positioning the aperture directly adjacent to an emitting face of the cylindrical lens wherein light received at the incident face is collimated by the cylindrical lens and emitted at the emitting face, and focusing the emitted light by the aperture within a beam width centered about the longitudinal plane on to the workpiece positioned along the longitudinal plane at a working distance from the emitting face.

In another embodiment, an edge-curing system may comprise a housing, including a linear array of light-emitting elements, a cylindrical lens, and a cylindrical lens mounted therein, wherein the cylindrical lens is positioned between the linear array of light-emitting elements and the aperture, a length of each of the linear array of light-emitting elements, the aperture, and the cylindrical lens are symmetrically aligned about a longitudinal plane, the aperture spans the length of the cylindrical lens and the length of the light-emitting elements, and is positioned directly adjacent to an emitting face of the cylindrical lens, and light emitted from the linear array of light-emitting elements and passing through the cylindrical lens is emitted from the emitting face and focused by the aperture within a beam width centered about the longitudinal plane.

In this manner, the technical result of emitting narrow beam width radiation for edge-curing a work piece comprising a narrow beam width target region while reducing over curing of the work piece outside of the narrow width region may be achieved. Furthermore, in some embodiments, the aperture may be removably mounted to the housing, thereby facilitating retrofitting of existing lighting devices. Further still, removably mounting the aperture to the housing can enable adjustment of the aperture size of the edge-curing device, making the edge-curing device more flexibly adaptable to various edge-curing applications.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 4 is a side cross-sectional view of a light emission spectra from the linear array of light-emitting elements of FIG. 1.

FIGS. 11A and 11B illustrate emission spectra for an edge-curing device without and with an integrated aperture, respectively.

FIG. 13 is a schematic of an example two of the edge-curing devices of FIG. 6 arranged end-to-end in series.

DETAILED DESCRIPTION

The present description relates to an edge-curing device, system, and method for emission of light in a narrow beam width on to a work piece positioned at a working distance from the edge-curing device and/or system. In conventional radiation and curing systems, light emitted from the light source may be emitted on to a workpiece over a broad target region. By including a cylindrical lens coupling optic and an integrated aperture, radiation from a linear array of light-emitting elements can be redirected and focused on to a narrow width target beam width, thereby advantageously enhancing curing within the narrow width target region and reducing over curing of the work piece in regions outside of the narrow beam width target region.

Figure 1B:
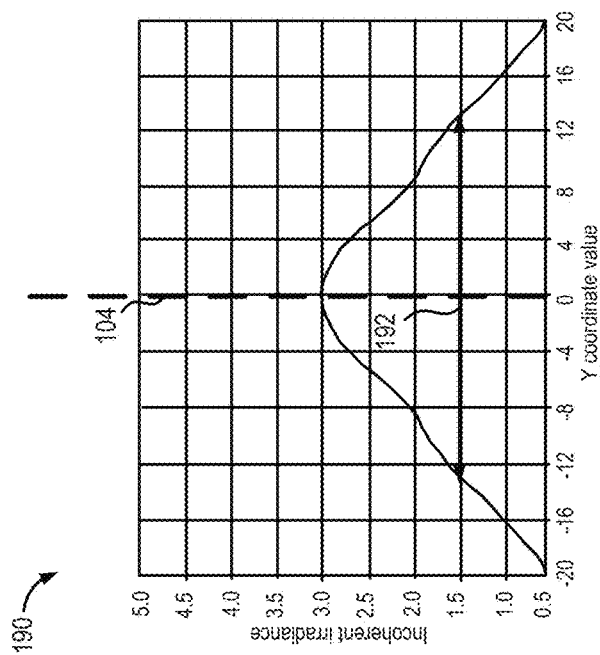
FIG. 1B illustrates an irradiance spectra at a widthwise-sectional plane of the emission spectra of FIG. 1.
Figure 1A:
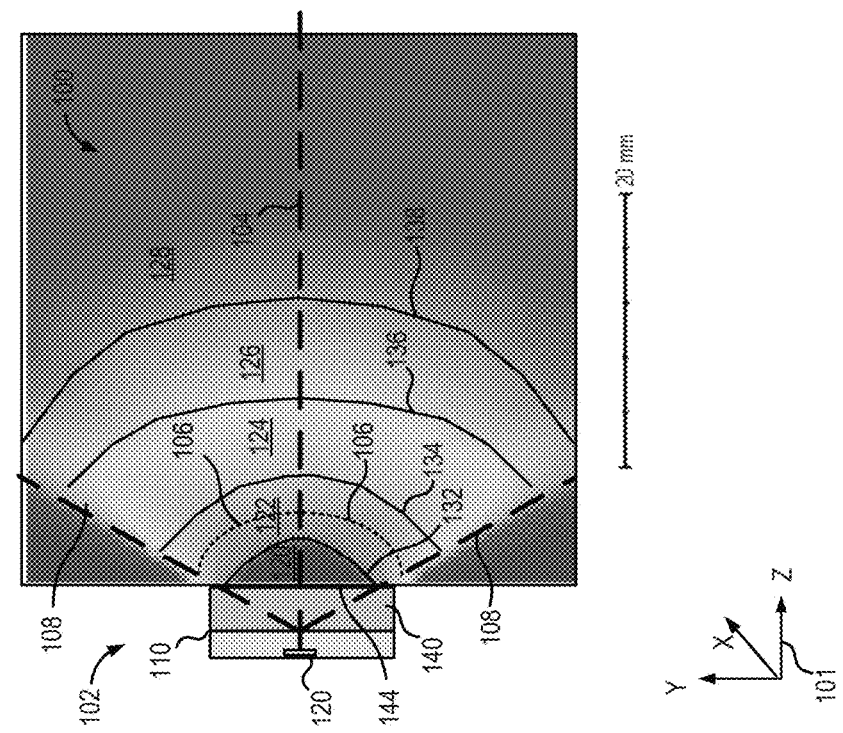
FIG. 1A illustrates an example of a near-Lambertian emission spectra emitted from a linear array of light-emitting elements.
Figure 2:
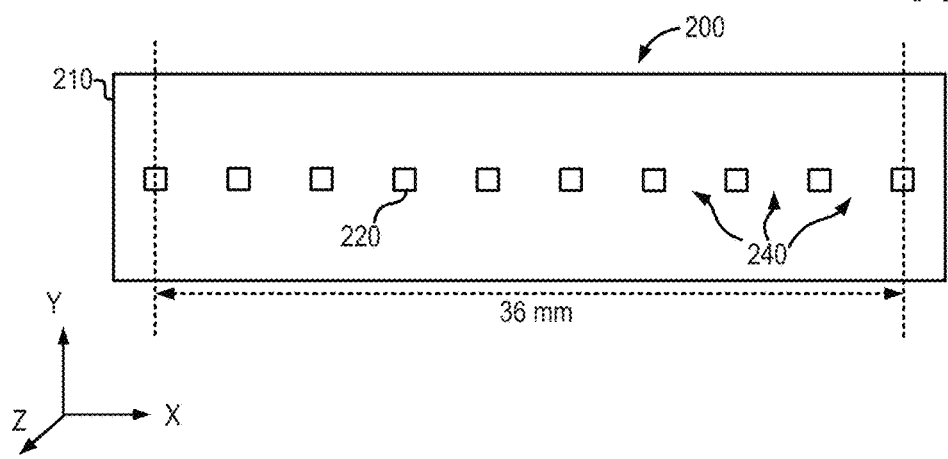
FIG. 2 is a schematic of an example of a regularly spaced linear array of light-emitting elements.
Figure 3:
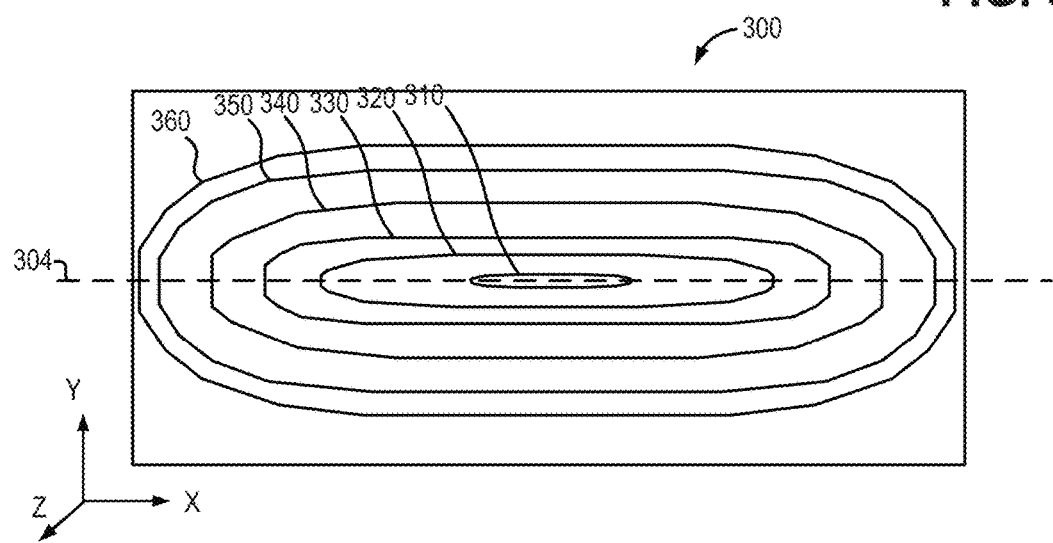
FIG. 3 is a schematic illustrating an irradiance spectra for the regularly spaced linear array of light-emitting elements of FIG. 2.
Figure 5B:
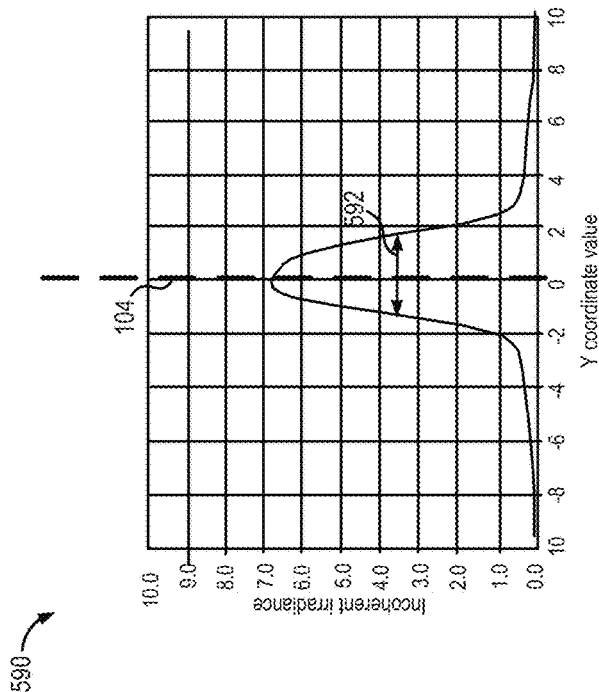
FIG. 5B illustrates an irradiance spectra at a widthwise-sectional plane of the emission spectra of FIG. 5A
Figure 5A:
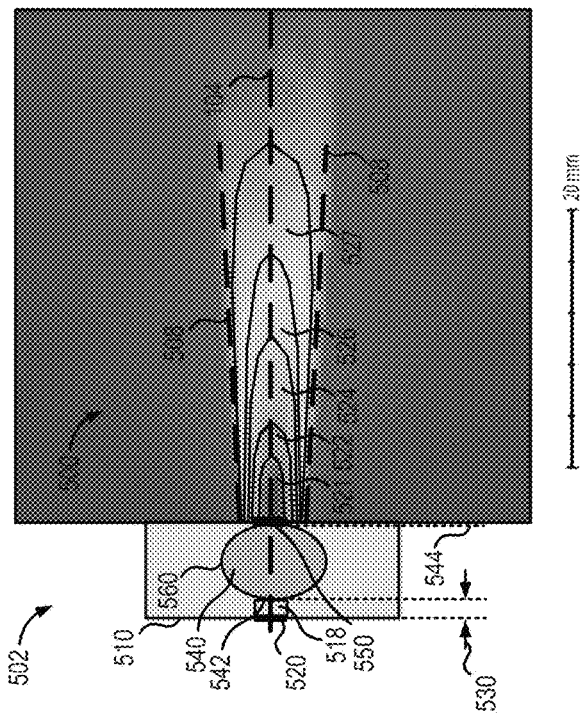
FIG. 5A illustrates an example of an emission spectra from the edge-curing device of FIGS. 6 and 10A-10D.
Figure 6:
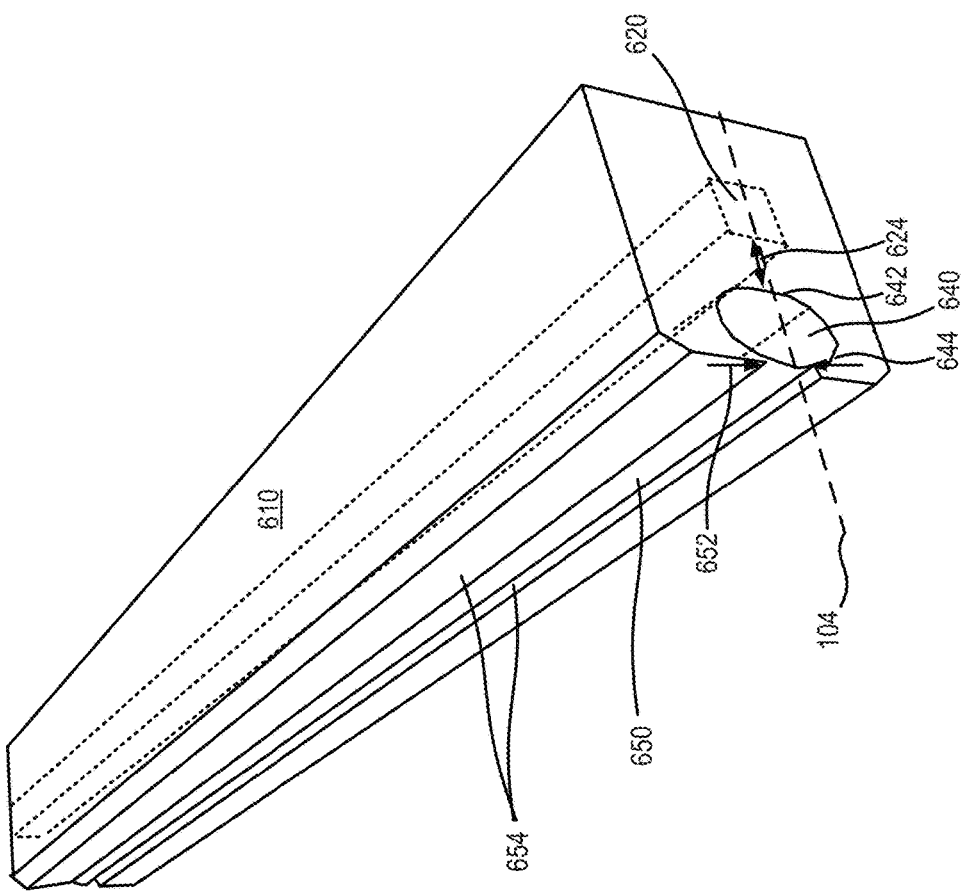
FIG. 6 illustrates a schematic of an edge-curing device.
Figure 7:
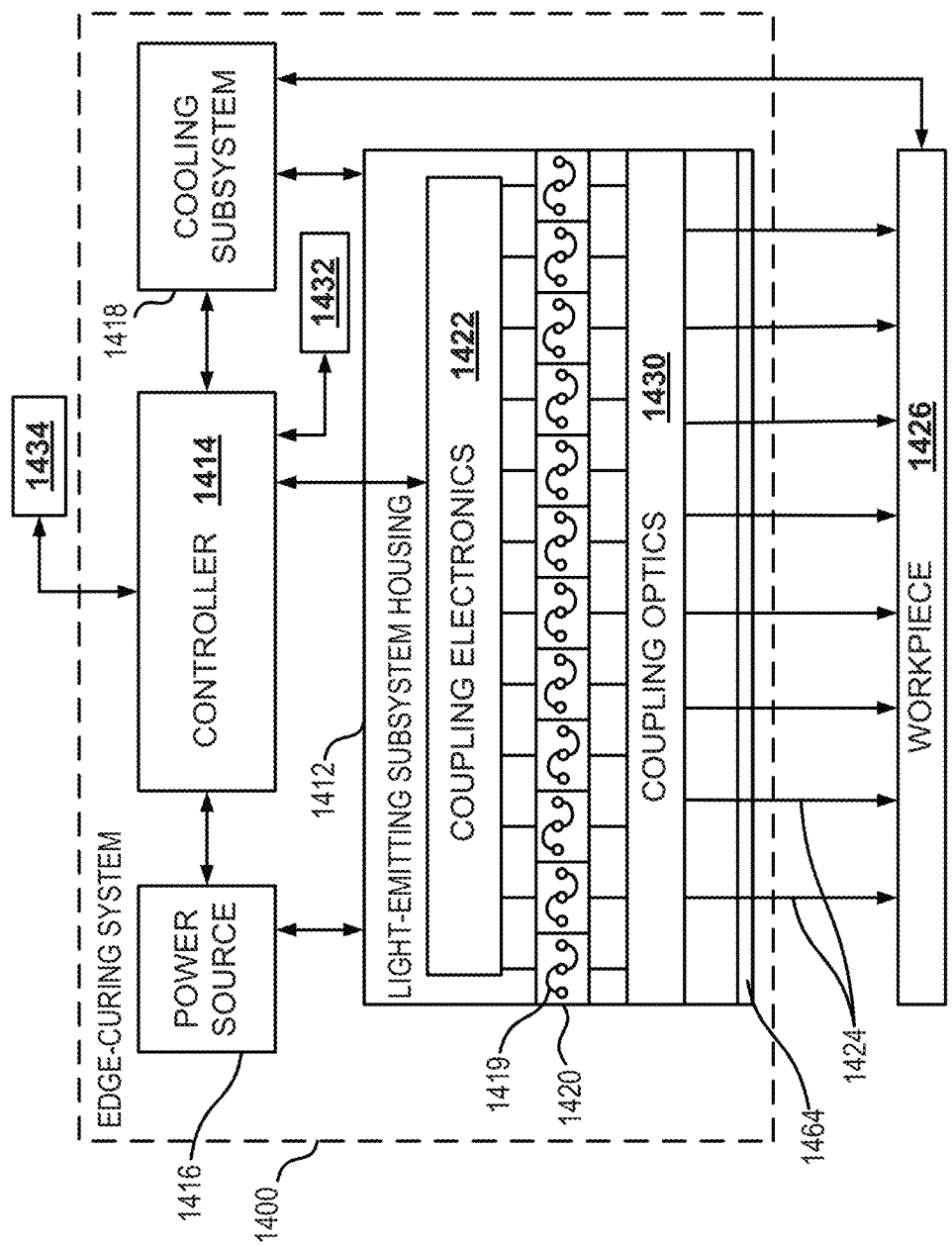
FIG. 7 is a schematic illustrating an example of a lighting system, including an edge-curing system.
Figure 12:
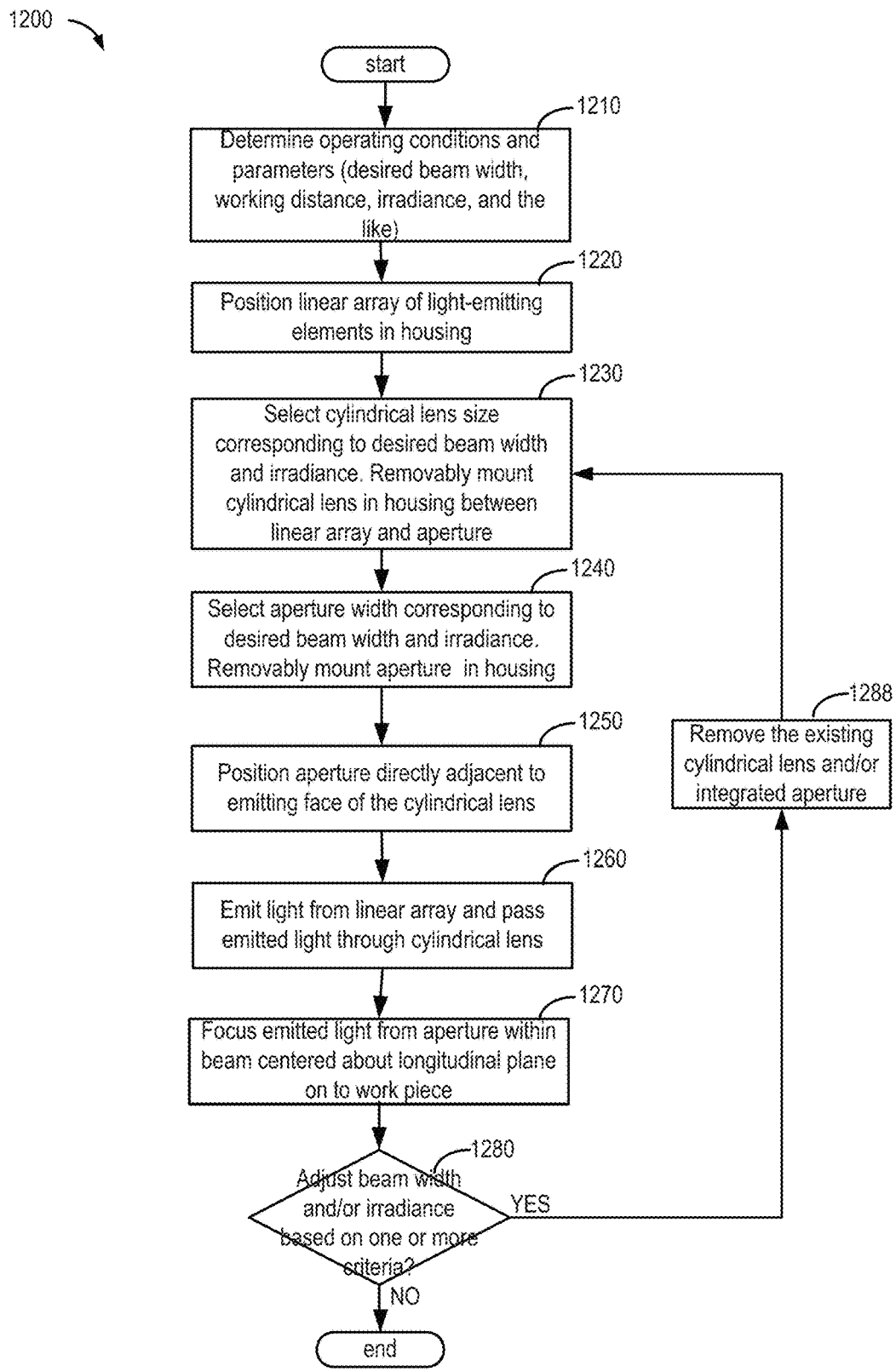
FIG. 12 illustrates a flow chart for an example method of edge-curing a work piece.

A conventional LED lighting system, as shown in FIGS. 1A and 1B, emits a broad Lambertian spectrum of radiation. For example, a light-emitting device with a linear array of light emitting elements as shown in FIG. 2 has a broad emission spectra as shown in FIG. 3. A cross-section of the radiation emission spectrum for the linear array of light-emitting elements is illustrated in FIG. 4. By positioning a cylindrical lens and an integrated aperture between the linear array of light-emitting elements and the target work piece, radiation from the linear array of light-emitting elements can be redirected and focused into a narrow width target region as shown in FIGS. 5A and 5B. An example of an edge-curing device including a cylindrical lens and an integrated aperture for narrow beam width radiation emission is illustrated in FIG. 6. Edge-curing devices may be arranged end-to-end in series, and may include edge-weighted linear arrays of light-emitting elements, as shown in FIG. 13. FIG. 7 illustrates a schematic for an example edge-curing system, including the edge-curing device of FIG. 6. The target beam width and the irradiance of the edge-curing system may be adjusted by changing the size of the aperture and/or cylindrical lens, as shown by the example plots of FIGS. 8-9. Various schematic views of an example edge-curing system are illustrated in FIGS. 10A-D. FIGS. 11A and B show emission spectra from an edge-curing system including a cylindrical lens without and with an aperture positioned at the emitting face of the cylindrical lens. Finally, a flow chart for a method of edge-curing a work piece is illustrated in FIG. 12.

Turning now to FIG. 1A, it illustrates an emission spectra 100 for a near-Lambertian light source 102 such as an array of LED type light-emitting elements. In FIG. 1A, the light source 102 is positioned symmetrically about a central axis 104 parallel to a z-axis (see axes 101). Central axis 104 may define a longitudinal plane passing through central axis 104 in the x-direction and oriented perpendicular to the y-z plane. The light source 102 may include a linear array of light emitting elements 120, a housing 110, and a cover glass 140. The emission spectra illustrates that the angular spread of light originating from the near-Lambertian light source is broad and symmetrically dispersed about a central axis 104 coincident with a 0 scan angle. A standard LED light source with a linear array of LEDs thus emits Lambertian radiation with angular content in all directions. Depending on the dimensions of the cover glass 140 (e.g., thickness in a z-direction), the emitted radiation spreads out broadly in a y-direction over a very short distance (along the z-direction) from the light source. For example, the emission spectra of FIG. 1A spreads in the y-direction so quickly over a short distance (in the z-direction) that it encompasses a much larger cross-section than a 3 mm target, even at an emitting face 144 of the glass surface. The emission spectra are principally emitted within an emission angle between +60 and −60 degrees (106) as shown by the dashed lines 108. Irradiance intensity is highest (blue color) at closer proximity to the emitting face 144 and decreases as the working distance increases farther away from the emitting face 144, as indicated by the emission spectra changing from green to yellow to red color, and as shown by the lines of constant irradiance 132, 134, 136, and 138.

Turning now to FIG. 1B, it illustrates an irradiance intensity of a cross section parallel to the y-z plane of the emission spectra of FIG. 1A. The y-coordinate value of 0 corresponds to the y-coordinate of central axis 104. Radiation is emitted by the Lambertian light-emitting device across a broad target region 40 mm wide, from −20 mm to +20 mm along the y-axis. Furthermore the full width at half maximum (FWHM) irradiance is approximately 25 mm as indicated by arrow 192. Clearly, an LED lighting system having a standard Lambertian emission spectrum emits light beyond a narrow target beam width, and can substantially over cure regions of a workpiece outside the narrow width target region.

FIG. 2 illustrates a simple schematic of an example of a high aspect ratio linear array 200 of light-emitting elements. In one example, the light-emitting elements may comprise Lambertian light-emitting elements. As shown in FIG. 2, high aspect ratio linear array 200 comprises a regularly spaced 36 mm linear array of ten light-emitting elements 220. Regularly spaced implies that a spacing 240 between each light-emitting element may be the same. The light-emitting elements may be mounted on a substrate 210, for example a printed circuit board (PCB). In addition to linear arrays of light-emitting elements, high aspect ratio arrays may also include two-dimensional arrays of light-emitting elements. Two dimensional high aspect ratio arrays may comprise a first number of light-emitting elements in a first dimension and a second number of light-emitting elements in a second dimension, wherein the first number is at least much larger than the second number. For example, a 2×8 two-dimensional array of light-emitting elements may be considered a high aspect ratio array.

FIG. 3 illustrates a plot 300 of an irradiance spectra at a fixed x-y plane located 6 mm away in a z-direction from the regularly spaced linear array of light-emitting elements in FIG. 2. The irradiance spectra of plot 300 may be generated using an optical simulation program such as Zemax. Curves 310, 320, 330, 340, 350, and 360 approximate lines of constant irradiance at a surface 6 mm away from the light source oriented perpendicular to the 90° emission angle of 1.80, 1.65, 1.30, 0.90, 0.40, and 0.20 W/cm² respectively. FIG. 3 illustrates the angular spread of light emitted from the linear regular-spaced array in a widthwise y-axis and a lengthwise x-axis. Irradiance from the regularly spaced array varies across the two dimensional spectra decreasing in intensity from the center of the spectra towards the periphery in both the x- and y-directions. As shown in the irradiance spectra of FIG. 3, the distribution of light is broadly dispersed about a main light-emitting axis 304. The dispersion of emitted light in the y-direction is beyond the boundaries of what would be referred to as a narrow target beam width for edge-curing applications. Thus a high aspect linear array of light-emitting elements, in the absence of coupling optics such as a cylindrical lens and an integrated aperture, can over-cure sensitive regions of a work piece located at regions outside of an edge illuminated by a narrow target beam width.

FIG. 4 is a schematic showing cross-sectional views along a longitudinal x-axis of a high aspect ratio (e.g., linear) array of light-emitting elements. Similar to high aspect ratio array 200 described above in FIG. 2, the light-emitting elements may emit light having a near Lambertian profile about a main light-emitting axis 450. FIG. 4 further illustrates light rays 470 of an irradiance intensity spectrum of light emitted from light source 102. The irradiance intensity is most concentrated a short distance from light source 102, and disperses quickly at distances further from light source 102, as illustrated by the contours 420, 430, and 440 of constant irradiance intensity. Light rays 470, extend symmetrically about both sides of main light-emitting axis 450.

Turning now to FIGS. 5A and 5B, they illustrate an example of a focused emission spectra 500 for an edge-curing device 502 and an irradiance spectra 590 for a cross section (parallel to the y-z plane) of the focused emission spectra 500, respectively. Edge-curing device 502 includes a housing 510, a linear array of light-emitting elements 520, a cylindrical lens 540, and an integrated aperture 550. The linear array of light-emitting elements may include a light-transparent window 518 interposed between the array of light-emitting elements and the cylindrical lens. Each of the linear array of light-emitting elements 520, the cylindrical lens 540, and the integrated aperture 550 may be widthwise (parallel to y-axis) centered about a central axis 104, and longitudinally aligned parallel and symmetrically about a longitudinal plane passing through the central axis 104 and extending in a direction parallel to the x-axis. The integrated aperture 550 may be positioned directly adjacent to a plane of the emitting face 544 of the cylindrical lens 540, and the width of the aperture (in the y-direction) may be less than a diameter of the cylindrical lens 560. Furthermore, a length of the integrated aperture 550 may span a length of the cylindrical lens 540 and a length of the linear array of light-emitting elements 520. The integrated aperture 550 may be integrated with the housing 510 such that the integrated aperture 550 is formed and positioned at the emitting face 544 by positioning the cylindrical lens 540 in the housing 510 and assembling the housing 510. The cylindrical lens 540 may be positioned (or interposed) between the linear array of light-emitting elements 520 and a target work piece positioned along the z-axis (c.f. axes 501) a distance away from the linear array of light-emitting elements 520. For example, the work piece may be centered about the central axis 104 and positioned a working distance away from the edge-curing device 502. Furthermore, the linear array of light-emitting elements 520 may be positioned so that a distance 530 between the linear array of light-emitting elements 520 and the incident plane of the cylindrical lens may be equivalent to the back focal length (BFL) of the cylindrical lens. The BFL may be calculated from the relationship: $BFL=(2-N)*R/2*(N-1)$; where N is the cylindrical lens index of refraction, and R is the radius of the cylindrical lens. In this way, substantially all of the radiation emitted from the linear array of light-emitting elements 520 is directed into an incident face 542 cylindrical lens. Incident face 542 may include an external surface area of the cylindrical lens 540 that contacts the window 518. A surface of the window 518 facing the cylindrical lens 540 may be shaped to snugly seat the cylindrical lens 540 so that when the cylindrical lens 540 is snugly seated therein and mounted in the housing 510 it is positioned relative to the linear array of light-emitting elements 520 and the central axis 104, as described above.

A cross-section of the cylindrical lens 540 may be centered about the central axis 104 of the linear array of light-emitting elements 520 so that radiation entering the incident face 542 of the cylindrical lens 540 from the linear array of light-emitting elements 520 is refracted and collimated within the cylindrical lens 540 and directed towards the integrated aperture 550 from emitting face positioned at the emitting plane 544. Integrated aperture 550 may be positioned between the cylindrical lens 540 and the target work piece and centered about central axis 104 so that radiation passing through the integrated aperture 550 is focused onto a narrow width region of the target work piece. A length of the cylindrical lens (e.g. in the x-direction into the page of FIG. 5) may span a length of the linear array of light-emitting elements 520. The cylindrical lens may absorb and/or reflect and disperse incident radiation at the boundary surfaces 560 of the housing, including refracting the radiation towards integrated aperture 550. The boundary surfaces 560 may include the interior surface of the housing 510 that contacts or is positioned directly adjacent to an exterior the cylindrical lens 540, excluding the portion of the external surface of the cylindrical lens 540 that remains exposed by the integrated aperture 550, and excluding the portion of the external surface of the cylindrical lens 540 that is in contact with the window 518 (e.g., in the path of incident light emitted from the linear array of light-emitting elements 520 to the cylindrical lens 540). Boundary surfaces 560 may include reflective materials, including reflective coatings, that may redirect incident light back into the cylindrical lens 540, including redirecting light towards the integrated aperture 550. Boundary surfaces 560 may further include absorptive materials, including absorptive coatings, that may absorb incident light or radiation. Redirecting incident light back to the cylindrical lens 540 from boundary surfaces 560 may aid in reducing accumulation of heat within the housing, but may increase an amount of stray light emitted from the edge-curing device 502. Redirected incident light from boundary surfaces 560 may be considered stray light since it may not be directed to a position falling within the boundaries 508 of the emitted beam width. Conversely, absorbing incident light at the boundary surfaces 560 may reduce an amount of stray light emitted from the edge-curing device 502 but may increase a thermal load of the edge-curing device. Additional thermal management devices and structures such as fans and cooling fins may be installed in the edge-curing device 502 in order to dissipate the thermal load.

As shown in FIG. 5, the emission spectra 500 from edge-curing device 502, including a cylindrical lens and integrated aperture, is much more focused across a narrow beam width (in the y-direction) across a larger working distance (in the z-direction) relative to the emission spectra 100 of the light source 102 of FIG. 1A, in the absence of both the integrated aperture 550 and the cylindrical lens 540. In particular, the emission spectra 500 is principally emitted within a narrow emission angle centered about central axis 104 between as shown by the beam width boundaries 508.

Irradiance intensity of the emission spectra is highest in a region (blue) centered about and adjacent to the aperture 550 and emitting face 544, and reduces in intensity (green to yellow to orange to red) at longer working distances from the emitting face 544, as shown by the lines of constant irradiance 521, 522, 524, 526, and 527.

FIG. 5B illustrates an irradiance intensity of a cross section of the emission spectra of FIG. 5A along the y-coordinate axis. The y-coordinate value of 0 corresponds to the y-coordinate of central axis 104. Radiation is emitted by the edge-curing device 502 across a focused target region 8 mm wide, from −2 mm to +2 mm along the y-axis. Accordingly, by including the cylindrical lens 540 and the integrated aperture 550, the edge-curing device 502 is able to achieve a focused emission spectrum that can cure a narrow width target region of a workpiece positioned a distance away (along a z-axis), while reducing over curing and irradiation outside the narrow width target region. Furthermore the full width at half maximum (FWHM) irradiance is approximately 2.5 mm as indicated by arrow 592, and within the FWHM beam, irradiance intensity peaks at nearly 7.0. In contrast, the light source 102 achieves only a 25 mm FWHM beam and an irradiance intensity peak of 3.0. Clearly, the edge-curing device 502, incorporating the cylindrical lens 540 and integrated aperture 550 can achieve higher-focused beam widths that can more easily attain the narrower target beam widths associated with edge-curing applications, thereby substantially reducing, if not averting, over cure in regions of a workpiece outside the narrow width target region. Furthermore, the narrower beam widths achieved by edge-curing device are emitted at higher irradiance intensity (7.0 for edge-curing device 502 vs 3.0 for lighting device 102), thereby enabling faster curing rates and increased performance of an edge-curing system.

The relative dimensions of the cylindrical lens 540, integrated aperture 550, and the target narrow width region may be selected appropriately. For example, for the case where the dimensions of the cylindrical lens 540 are too small (e.g. too small a radius R) relative to the linear array of light-emitting elements, a large portion of the radiation from the linear array of light-emitting elements will not be directed into the cylindrical lens. For the case where the dimensions of the cylindrical lens 540 are too large relative to the integrated aperture 550, a large portion of the radiation will be lost or "cut" (e.g., not directed) through the aperture. In one embodiment, a 6 mm diameter cylindrical lens and a 4 mm wide aperture may be utilized for emitting a 3 mm width narrow beam (at full width half max FWHM) of radiation for curing a 3 mm region on a target work piece surface positioned 10 mm away (along the z-direction) from the integrated aperture 550. FWHM refers to a width of the beam measured at the 50% point of its peak irradiance. Reducing a width of the narrow width beam less than 3 mm may result in larger radiation intensity losses because the BFL of the cylindrical lens becomes smaller (as the cylindrical lens dimension is reduced) relative to the linear array of light-emitting elements dimension. As the dimensions of the integrated aperture (e.g., length in a y-direction) increases, the width of the beam emitted from the aperture increases. As the radius of the cylindrical lens increases, in general, the width of the beam emitted from the aperture increases.

Turning now to FIG. 6, it illustrates a schematic of an example edge-curing device 600 including a housing 610 that includes a cylindrical lens 640, a linear array of light-emitting elements 620, and an integrated aperture 650 centered about a longitudinal plane passing through a central axis 104. As shown in FIG. 6, a length of the integrated aperture 650 and a length of the cylindrical lens 640 each spans a length of the linear array of light-emitting elements 620. Furthermore, the integrated aperture 650, the cylindrical lens 640, and the linear array of light-emitting elements 620 are aligned parallel to a longitudinal axis perpendicular to the central axis 104. In this way, light emitted from the entire length of the linear array of light-emitting elements 620 may be passed through the cylindrical lens 540 at an incident face 642 and redirected and emitted through the integrated aperture 650 at emitting face 644.

As previously described, the linear array of light-emitting elements 620 may be positioned a distance 624 from the incident face 642 of the cylindrical lens 640, and distance 624 may correspond to the BFL of the cylindrical lens. By positioning the incident face 642 a BFL from the linear array of light-emitting elements, a higher fraction of the light emitted from the linear array of light-emitting elements 620 may be directed into the cylindrical lens 640, and may be collimated and emitted from the integrated aperture 650 positioned adjacent to the emitting face 644. Radiation from the linear array of light-emitting elements 620 enters the cylindrical lens 640 and is refracted by the cylindrical lens towards the integrated aperture 650. The integrated aperture 650 may have a width 652 sized to focus a narrow width beam of radiation on to a target surface of a work piece positioned along the central axis a distance away from the edge-curing device 600. For example, the width 652 of the aperture may be less than the diameter of the cylindrical lens 640. Having an aperture width 652 less than the diameter of the cylindrical lens 640 can aid in narrowing a beam width emitted from the integrated aperture 650, as described with reference to FIGS. 8 and 9.

As shown in FIG. 6, the cylindrical lens 640, the integrated aperture 650, and the linear array of light-emitting elements 620 may span a length of the housing 610 so that multiple edge-curing devices 600 may be positioned and aligned end-to-end in series for curing narrow width regions that are longer than the length of a single edge-curing device 600, while reducing distortion of the narrow width target region and loss of irradiance intensity across multiple devices. To this end, the linear array of light-emitting elements may include an edge-weighted linear array of light-emitting elements, including two or more more closely spaced (e.g. a higher density) light-emitting elements at each lengthwise edge of the linear array. In other words, light-emitting elements near a central portion of the edge-weighted linear array may be spaced farther apart than the closer-spaced light-emitting elements at lengthwise edges of the linear array. Edge-weighted linear arrays of light-emitting elements may increase a uniformity of emitted light, especially in regions between adjacent end-to-end edge-curing devices.

Turning now to FIG. 13, it illustrates a partial frontal view of two edge-curing devices 1310, 1320 arranged end-to-end in series. Edge-curing devices 1310 and 1320 may each be identical to edge-curing device 600, except the evenly-spaced linear array of light-emitting elements 620 is replaced with edge-weighted linear arrays of light-emitting elements. Thus, edge-curing devices 1310, 1320 may each comprise an edge weighted linear array of light-emitting elements. The edge-weighted linear array of light-emitting elements may longitudinally aligned along a longitudinal plane passing through a central axis 104 with a cylindrical lens and an integrated aperture (indicated by 1392, 1394), as described above with reference to FIG. 6.

Each edge-weighted linear array comprises light-emitting elements 1350 distributed with a first spacing 1354 in a middle (central) portion, and light-emitting elements 1360 distributed with a second spacing 1364 in end portions. Furthermore, edge-curing devices 1310 and 1320 comprise a third spacing 1368 and a fourth spacing 1374 between light-emitting elements 1350, 1360 of the middle and end portions respectively. Third spacing 1368 may be larger than second spacing 1364 and smaller than first spacing 1354. As described above, edge weighting the linear array of light-emitting elements increases the useable width of light output from each light source.

Furthermore, first and last light-emitting elements in the end portions of edge-curing devices 1320 and 1310 respectively are positioned adjacent to window (or housing) sidewalls 1386, wherein the housing sidewalls 1386 span the length of the front plane of each light source housing. Positioning the first and last light-emitting elements in the linear arrays adjacent to housing sidewalls 1386 may allow the linear array of light-emitting elements to irradiate light more uniformly across the entire length of the edge-curing device.

Further still, the thicknesses of the housing sidewalls 1386 are thin, and housing sidewalls 1386 may extend backward perpendicularly from the front plane of the housing so that edge-curing devices may be positioned so that their adjacent housing sidewalls are flushly contacted when the edge-curing devices are positioned end-to-end in series. Constructing light sources with thin window and housing sidewalls and aligning the window sidewalls to be flush with the housing sidewalls may reduce spacing between and may maintain continuity of irradiated light across multiple light sources arranged side by side. In this manner, light irradiated from edge-curing devices 1320 and 1310 arranged end-to-end in series may be more uniform as compared to light irradiated from conventional light sources arranged end-to-end in series.

Referring now to FIG. 7, it illustrates a block diagram for an example configuration of an edge-curing system 1400. In one example, edge-curing system 1400 may comprise a light-emitting subsystem 1412, a controller 1414, a power source 1416 and a cooling subsystem 1418. The light-emitting subsystem 1412 may comprise a plurality of semiconductor devices 1419. The plurality of semiconductor devices 1419 may be a linear array 1420 of light-emitting elements such as a linear array of LED devices, including an edge-weighted linear array of light-emitting elements, for example. Semiconductor devices may provide radiant output 1424. The radiant output 1424 may be directed to a workpiece 1426 located at a fixed plane from edge-curing system 1400. Furthermore, the linear array of light-emitting elements may be an edge weighted linear array of light-emitting elements, wherein one or more methods are employed to increase the useable length of light output at workpiece 1426. For example, one or more of edge weighted spacing, lensing (e.g. providing coupling optics) of individual light-emitting elements, providing individual light-emitting elements of different intensity, and supplying differential current to individual LEDs may be employed as described above. For example LEDs near the edges (e.g., ends) of the linear array of light-emitting elements may be positioned to have a denser spacing as compared to LEDs in the center of the linear array of light-emitting elements so that an irradiance intensity emitted from the linear array of light-emitting elements is more uniform across a length of the linear array of light-emitting elements, in particular, near the end regions of the linear array of light-emitting elements.

Furthermore, edge-weighted spacing can reduce distortions and regions of non-uniform irradiance of emitted light from multiple linear array of light-emitting elements when positioned side by side (e.g., end to end), in particular, in regions where two ends of adjacent linear array of light-emitting elements meet.

The radiant output 1424 may be directed to the workpiece 1426 via coupling optics 1430, including a cylindrical lens and an integrated aperture. The coupling optics 1430, if used, may be variously implemented. As an example, the coupling optics may include one or more layers, materials or other structures interposed between the semiconductor devices 1419 and window 1464, and providing radiant output 1424 to surfaces of the workpiece 1426. As an example, the coupling optics 1430 may include a micro-lens array to enhance collection, condensing, collimation or otherwise the quality or effective quantity of the radiant output 1424. As another example, the coupling optics 1430 may include a micro-reflector array. In employing such a micro-reflector array, each semiconductor device providing radiant output 1424 may be disposed in a respective micro-reflector, on a one-to-one basis. As another example, a linear array of semiconductor devices 1420 providing radiant output 24 and 25 may be disposed in macro-reflectors, on a many-to-one basis. In this manner, coupling optics 1430 may include both micro-reflector arrays, wherein each semiconductor device is disposed on a one-to-one basis in a respective micro-reflector, and macro-reflectors wherein the quantity and/or quality of the radiant output 1424 from the semiconductor devices is further enhanced by macro-reflectors.

Each of the layers, materials or other structure of coupling optics 1430 may have a selected index of refraction. By properly selecting each index of refraction, reflection at interfaces between layers, materials and other structures in the path of the radiant output 1424 may be selectively controlled. As an example, by controlling differences in such indexes of refraction at a selected interface, for example window 1464, disposed between the semiconductor devices to the workpiece 1426, reflection at that interface may be reduced or increased so as to enhance the transmission of radiant output at that interface for ultimate delivery to the workpiece 1426. For example, the coupling optics may include a dichroic reflector where certain wavelengths of incident light are absorbed, while others are reflected and focused to the surface of workpiece 1426.

The coupling optics 1430 may be employed for various purposes. Example purposes include, among others, to protect the semiconductor devices 1419, to retain cooling fluid associated with the cooling subsystem 1418, to collect, condense and/or collimate the radiant output 1424, or for other purposes, alone or in combination. As a further example, the edge-curing system 1400 may employ coupling optics 1430 so as to enhance the effective quality, uniformity, or quantity of the radiant output 1424, particularly as delivered to the workpiece 1426.

As a further example, coupling optics 1430 may comprise a cylindrical lens through which light emitted from the linear array of light-emitting elements is directed. As previously described, light emitted from the linear array of light-emitting elements may be incident at an incident face of the cylindrical lens, and may be collimated and redirected out of an emitting face of the cylindrical lens. The cylindrical lens may include one or more of a rod lens, a semi-circular lens, a plano-convex lens, a bi-convex lens, and a faceted Fresnel lens. The cylindrical lens may include a cylindrical lens having a cylindrical power axis and an orthogonal plano axis, for collimating and/or focusing the light emitted from the linear array 1420 of semiconductor devices 1419. In particular, a cylindrical Fresnel lens may be aligned with the linear array 1420, wherein emitted light therefrom is emitted through the cylindrical Fresnel lens and wherein the cylindrical Fresnel lens reduces the angular spread of light in a widthwise axis of the linear array, the linear array spanning a lens length. The emitting face of the cylindrical lens may span a widthwise dimension of the integrated aperture. In the case where the cylindrical lens includes a cylindrical Fresnel lens, a single-groove Fresnel lens or a multiple groove Fresnel lens may be utilized to further reduce the angular spread of emitted light in a widthwise axis as compared to a single cylindrical Fresnel lens.

As a further example, the coupling optics 1430 may include a cylindrical lens in combination with an integrated aperture (as shown in FIG. 6) spanning the length of the linear array of light-emitting elements. The integrated aperture may be positioned at the emitting face for focusing the light emitted therefrom in a narrower width beam on to a workpiece surface, as suitable for edge-curing applications. The cylindrical lens may be positioned a distance from the linear array of light-emitting elements corresponding to a BFL of the cylindrical lens, wherein radiation emitted from the linear array of light-emitting elements enters the cylindrical lens where it is refracted towards the integrated aperture. Radiation exiting the integrated aperture is focused in a narrow width beam on to a target work piece surface for curing a narrow width region on the target workpiece surface. Both the cylindrical lens and the integrated aperture may be positioned symmetrically about a central axis of the linear array of light-emitting elements, as shown in FIGS. 5A, 5B, and 6.

Selected of the plurality of semiconductor devices 1419 may be coupled to the controller 1414 via coupling electronics 1422, so as to provide data to the controller 1414. As described further below, the controller 1414 may also be implemented to control such data-providing semiconductor devices, e.g., via the coupling electronics 1422. The controller 1414 may be connected to, and may be implemented to control, the power source 1416, and the cooling subsystem 1418. For example, the controller may supply a larger drive current to light-emitting elements distributed in the middle portion of linear array 1420 and a smaller drive current to light-emitting elements distributed in the end portions of linear array 1420 in order to increase the useable length of light irradiated at workpiece 1426. Moreover, the controller 1414 may receive data from power source 1416 and cooling subsystem 1418. In one example, the irradiance at one or more locations at the workpiece 1426 surface may be detected by sensors and transmitted to controller 1414 in a feedback control scheme. In a further example, controller 1414 may communicate with a controller of another lighting system (not shown in FIG. 7) to coordinate control of both lighting systems. For example, controller 1414 of multiple lighting systems may operate in a master-slave cascading control algorithm, where the set point of one of the controllers is set by the output of the other controller. Other control strategies for operation of lighting system 10 in conjunction with another lighting system may also be used. As another example, controller 1414 for multiple lighting systems arranged side by side may control lighting systems in an identical manner for increasing uniformity of irradiated light across multiple lighting systems.

In addition to the power source 1416, cooling subsystem 1418, and light-emitting subsystem 1412, the controller 1414 may also be connected to, and implemented to control internal element 1432, and external element 1434. Element 1432, as shown, may be internal to the edge-curing system 1400, while element 1434, as shown, may be external to the edge-curing system 1400, but may be associated with the workpiece 1426 (e.g., handling, cooling or other external equipment) or may be otherwise related to a photoreaction (e.g. curing) that edge-curing system 1400 supports.

The data received by the controller 1414 from one or more of the power source 1416, the cooling subsystem 1418, the light-emitting subsystem 1412, and/or elements 1432 and 1434, may be of various types. As an example, the data may be representative of one or more characteristics associated with coupled semiconductor devices 1419. As another example, the data may be representative of one or more characteristics associated with the respective light-emitting subsystem 1412, power source 1416, cooling subsystem 1418, internal element 1432, and external element 1434 providing the data. As still another example, the data may be representative of one or more characteristics associated with the workpiece 1426 (e.g., representative of the radiant output energy or spectral component(s) directed to the workpiece). Moreover, the data may be representative of some combination of these characteristics.

The controller 1414, in receipt of any such data, may be implemented to respond to that data. For example, responsive to such data from any such component, the controller 1414 may be implemented to control one or more of the power source 1416, cooling subsystem 1418, light-emitting subsystem 1412 (including one or more such coupled semiconductor devices), and/or the elements 32 and 34. As an example, responsive to data from the light-emitting subsystem indicating that the light energy is insufficient at one or more points associated with the workpiece, the controller 1414 may be implemented to either (a) increase the power source's supply of power to one or more of the semiconductor devices, (b) increase cooling of the light-emitting subsystem via the cooling subsystem 1418 (e.g., certain light-emitting devices, if cooled, provide greater radiant output), (c) increase the time during which the power is supplied to such devices, or (d) a combination of the above.

In the example where a printing and curing system comprises edge-curing system 1400, controller 1414 may also receive input from light sensors 436 at a printer head. For example, in response to a measured intensity of light reflected from workpiece 1426 onto the printer head, controller 1414 may adjust a transverse offset of the optical element (e.g., coupling optics 1430 of edge-curing system 1400) in order to reduce the intensity of light reflected from workpiece 1426 onto the printer head.

Individual semiconductor devices 1419 (e.g., LED devices) of the light-emitting subsystem 1412 may be controlled independently by controller 1414. For example, controller 1414 may control a first group of one or more individual LED devices to emit light of a first intensity, wavelength, and the like, while controlling a second group of one or more individual LED devices to emit light of a different intensity, wavelength, and the like. The first group of one or more individual LED devices may be within the same linear array 1420 of semiconductor devices, or may be from more than one linear array of semiconductor devices 1420 from multiple edge-curing systems 1400. Linear array 1420 of semiconductor device may also be controlled independently by controller 1414 from other linear arrays of semiconductor devices in other lighting systems. For example, the semiconductor devices of a first linear array may be controlled to emit light of a first intensity, wavelength, and the like, while those of a second linear array in another lighting system may be controlled to emit light of a second intensity, wavelength, and the like.

As a further example, under a first set of conditions (e.g. for a specific workpiece, photoreaction, and/or set of operating conditions) controller 1414 may operate edge-curing system 1400 to implement a first control strategy, whereas under a second set of conditions (e.g. for a specific workpiece, photoreaction, and/or set of operating conditions) controller 1414 may operate edge-curing system 1400 to implement a second control strategy. As described above, the first control strategy may include operating a first group of one or more individual semiconductor devices (e.g., LED devices) to emit light of a first intensity, wavelength, and the like, while the second control strategy may include operating a second group of one or more individual LED devices to emit light of a second intensity, wavelength, and the like. The first group of LED devices may be the same group of LED devices as the second group, and may span one or more arrays of LED devices, or may be a different group of LED devices from the second group, but the different group of LED devices may include a subset of one or more LED devices from the second group.

The cooling subsystem 1418 may be implemented to manage the thermal behavior of the light-emitting subsystem 1412. For example, the cooling subsystem 1418 may provide for cooling of light-emitting subsystem 1412, and more specifically, the semiconductor devices 1419. The cooling subsystem 1418 may also be implemented to cool the workpiece 1426 and/or the space between the workpiece 1426 and the edge-curing system 1400 (e.g., the light-emitting subsystem 1412). For example, cooling subsystem 1418 may comprise an air or other fluid (e.g., water) cooling system. Cooling subsystem 1418 may also include cooling elements such as cooling fins attached to the semiconductor devices 1419, or linear array 1420 thereof, or to the coupling optics 1430. For example, cooling subsystem may include blowing cooling air over the coupling optics 1430, wherein the coupling optics 1430 are equipped with external fins to enhance heat transfer.

The edge-curing system 1400 may be used for various applications. Examples include, without limitation, curing applications ranging from displays, photoactive adhesives, and ink printing to the fabrication of DVDs and lithography. The applications in which the edge-curing system 1400 may be employed can have associated operating parameters. That is, an application may have associated operating parameters as follows: provision of one or more levels of radiant power, at one or more wavelengths, applied over one or more periods of time. In order to properly accomplish the photoreaction associated with the application, optical power may be delivered at or near the workpiece 1426 at or above one or more predetermined levels of one or a plurality of these parameters (and/or for a certain time, times or range of times).

In order to follow an intended application's parameters, the semiconductor devices 1419 providing radiant output 1424 may be operated in accordance with various characteristics associated with the application's parameters, e.g., temperature, spectral distribution and radiant power. At the same time, the semiconductor devices 1419 may have certain operating specifications, which may be associated with the semiconductor devices' fabrication and, among other things, may be followed in order to preclude destruction and/or forestall degradation of the devices. Other components of the edge-curing system 1400 may also have associated operating specifications. These specifications may include ranges (e.g., maximum and minimum) for operating temperatures and applied electrical power, among other parameter specifications.

Accordingly, the edge-curing system 1400 may support monitoring of the application's parameters. In addition, the edge-curing system 1400 may provide for monitoring of semiconductor devices 1419, including their respective characteristics and specifications. Moreover, the edge-curing system 1400 may also provide for monitoring of selected other components of the edge-curing system 1400, including its characteristics and specifications.

Providing such monitoring may enable verification of the system's proper operation so that operation of edge-curing system 1400 may be reliably evaluated. For example, edge-curing system 1400 may be operating improperly with respect to one or more of the application's parameters (e.g. temperature, spectral distribution, radiant power, and the like), any component's characteristics associated with such parameters and/or any component's respective operating specifications. The provision of monitoring may be responsive and carried out in accordance with the data received by the controller 1414 from one or more of the system's components.

Monitoring may also support control of the system's operation. For example, a control strategy may be implemented via the controller 1414, the controller 1414 receiving and being responsive to data from one or more system components. This control strategy, as described above, may be implemented directly (e.g., by controlling a component through control signals directed to the component, based on data respecting that components operation) or indirectly (e.g., by controlling a component's operation through control signals directed to adjust operation of other components). As an example, a semiconductor device's radiant output may be adjusted indirectly through control signals directed to the power source 1416 that adjust power applied to the light-emitting subsystem 1412 and/or through control signals directed to the cooling subsystem 1418 that adjust cooling applied to the light-emitting subsystem 1412.

Control strategies may be employed to enable and/or enhance the system's proper operation and/or performance of the application. In a more specific example, control may also be employed to enable and/or enhance balance between the linear array's radiant output and its operating temperature, so as, e.g., to preclude heating the semiconductor devices 1419 beyond their specifications while also directing sufficient radiant energy to the workpiece 1426, for example, to carry out a photoreaction of the application. Furthermore, in some examples, a controller may be used to automatically adjust the offset position of a lens relative to a main light emitting axis of a light source in order to adjust the angular deflection of light emitted from an edge-curing device 1000 towards a target substrate 440. Accordingly, a printing and curing system may be automatically adjusted to various curing conditions and target substrates in a continuous manner without having to manually adjust the printing and curing system.

In a further example, the irradiance at one or more locations at the workpiece 1426 surface may be detected by sensors and transmitted to controller 1414 in a feedback control scheme. In the case where the controller 1414 detects insufficient irradiance at an edge-curing application, a signal may be sent (e.g., audio alert, or visual alert at an operator interface) to adjust a cylindrical lens diameter or to adjust an aperture width to increase or decrease a beam width or increase or decrease an irradiance. The adjustments made to the cylindrical lens diameter or the aperture width may be performed according to the predetermined (empirical or otherwise) relationships between the aperture width, cylindrical lens diameter, irradiance, and beam width, as described with reference to FIGS. 8 and 9. Furthermore, adjusting an aperture width and/or cylindrical lens diameter may include removably mounting the integrated aperture (or housing components associated therewith as described with reference to FIGS. 10A-D) and/or removably mounting the cylindrical lens (or housing components associated therewith as described with reference to FIGS. 10A-D). The capability of removably mounting the cylindrical lens and/or the integrated aperture facilitates adjustment of the aperture width and cylindrical lens diameter (and consequent beam width, and irradiance) without changing a position or relative alignment between the edge-curing device and the work piece, which can reduce manufacturing downtime and increase operational efficiency.

In some applications, high radiant power may be delivered to the workpiece 1426, and the workpiece 1426 may comprise a light-curable material, including a substrate with a light-curable material printed thereon. Accordingly, the light-emitting subsystem 1412 may be implemented using a linear array of light-emitting semiconductor devices 1420. For example, the light-emitting subsystem 1412 may be implemented using a high-density, light-emitting diode (LED) array. Although linear array of light-emitting elements may be used and are described in detail herein, it is understood that the semiconductor devices 1419, and linear arrays 1420 thereof, may be implemented using other light-emitting technologies without departing from the principles of the invention; examples of other light-emitting technologies include, without limitation, organic LEDs, laser diodes, other semiconductor lasers.

Figure 8:
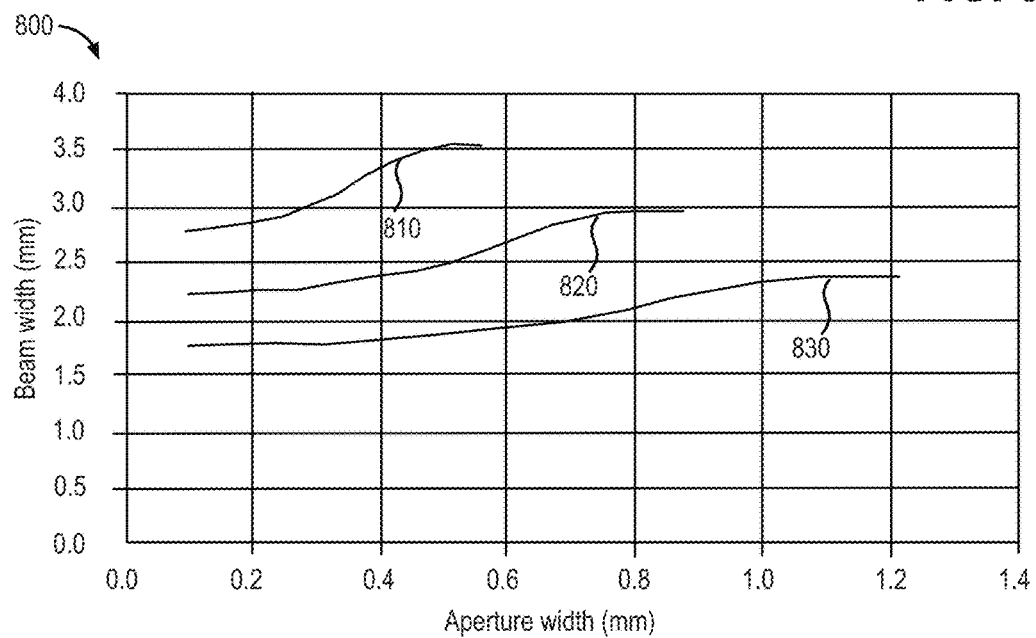
FIGS. 8-9 are example plots illustrating a relationship between beam size and irradiance and aperture width for an edge-curing device of FIGS. 6 and 10A-10D.
Figure 9:
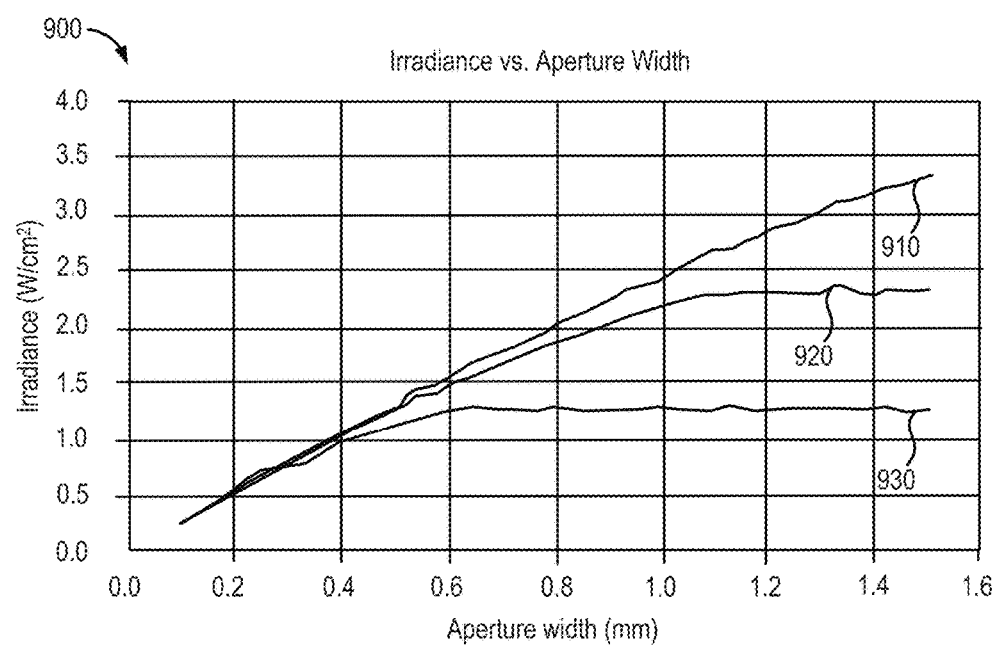
Figure 10A:
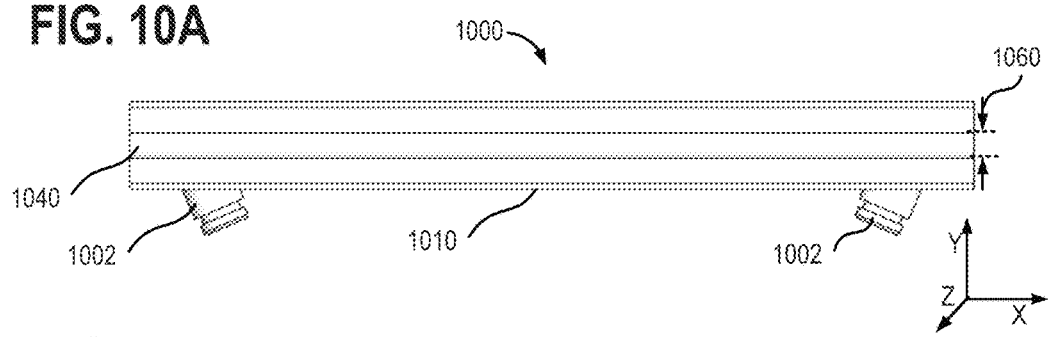
FIGS. 10A-D illustrate a frontal view, a top view, a side view, and a cross-sectional view, respectively, of an edge-curing device.
Figure 10B:
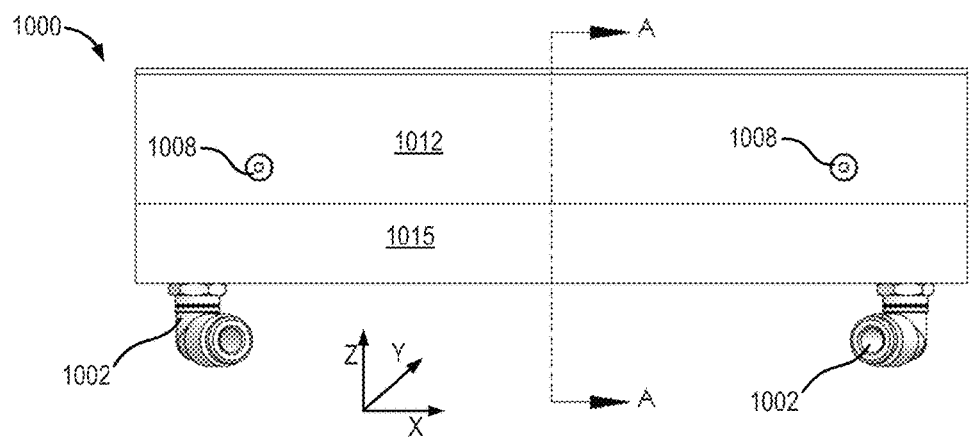
Figure 10C:
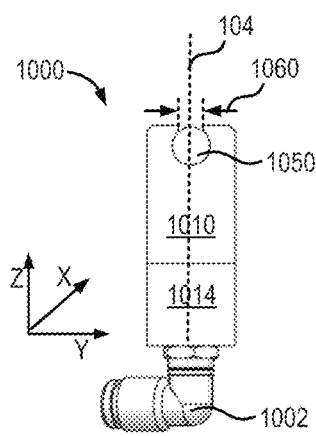
Figure 10D:
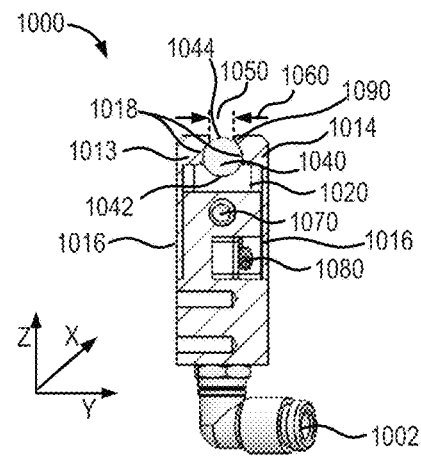

Turning now to FIGS. 8 and 9, they illustrate a plot showing the relationship between beam width versus aperture width for a 3 mm rod lens (trendline 810), 4 mm rod lens (trendline 820) and 5 mm rod lens (trendline 830); and a plot showing the relationship between irradiance versus aperture width for a 3 mm rod lens (trendline 930), 4 mm rod lens (trendline 920), and 5 mm rod lens (trendline 910). In edge-curing applications, the cylindrical lens diameter and the aperture width may be selected to achieve a desired beam width and a desired irradiance emitted at a surface of the workpiece. Referencing FIG. 8, for a given cylindrical lens diameter, the emitted beam width increases with aperture width up to a threshold aperture width, above which the beam width levels off. For example, for a rod lens diameter of 3 mm, the beam width (trendline 810) increases up to a threshold aperture width near 0.5 mm above which the beam width remains at about 3.5 mm. Similarly, for a rod lens diameter of 4 mm, the beam width (trendline 820) increases up to a threshold aperture width near 0.8 mm above which the beam width remains at about 3.0 mm, and for a rod lens diameter of 5 mm, the beam width (trendline 830) increases up to a threshold aperture width near 01.0 mm above which the beam width remains at about 2.4 mm. As shown by comparing curves (trendline 810), (trendline 820), and (trendline 830), beam widths may decrease with increasing cylindrical lens diameter for a give aperture width. Furthermore, threshold aperture width above which beam width levels off may increase with increasing rod lens diameter. In other words, edge-curing devices 600 employing larger cylindrical lens diameters may facilitate achieving narrower beam widths, and may enable toggling beam widths over a larger range by adjusting the aperture width. However, edge-curing devices employing larger cylindrical lens diameters may suffer from larger sized housings 610 which can increase a size and encumbrance of the overall edge-curing device, and make it more difficult for edge-curing applications in confined spaces or involving cure of smaller components. Furthermore, in any particular edge-curing application, an aperture width may be selected corresponding to a desired beam width and cylindrical lens diameter.

Referencing FIG. 9, for a given cylindrical lens diameter, the emitted irradiance at a surface of the work piece may increase up to a threshold aperture width, above which the irradiance may level off. For example, for a rod lens diameter of 3 mm, the irradiance (trendline 910) increases up to a threshold aperture width near 0.5 mm above which the irradiance remains at about 1.3 W/cm$^2$. Similarly, for a rod lens diameter of 4 mm, the irradiance (trendline 920) increases up to a threshold aperture width near 0.9 mm above which the irradiance remains at about 2.3 W/cm$^2$. As shown by comparing curves (trendline 910), (trendline 920), and (trendline 930), the irradiance emitted at a surface of the work piece may increase with increasing cylindrical lens diameter for a given aperture width. Furthermore, threshold aperture widths above which irradiance levels off may increase with increasing rod lens diameter. In other words, edge-curing devices 600 employing larger cylindrical lens diameters may facilitate achieving higher irradiance levels, and may enable toggling irradiance over a larger range by adjusting the aperture width. However, as described above, edge-curing devices employing larger cylindrical lens diameters may suffer from larger sized housings 610 which can increase a size and encumbrance of the overall edge-curing device, and make it more difficult for edge-curing applications in confined spaces or involving cure of smaller components. Furthermore, in any particular edge-curing application, an aperture width may be selected corresponding to a desired irradiance level and cylindrical lens diameter.

Turning now to FIGS. 10A-D, they illustrate frontal, top, side, and cross-sectional views of an edge-curing device 1000, including a linear array of light-emitting elements 1020, a cylindrical lens 1040, and an integrated aperture, each longitudinally aligned parallel and symmetrically about a longitudinal plane passing through the central axis 104 and extending in a direction parallel to the x-axis. Edge-curing device may further include one or more conduits 1002 for electrically connecting wires for electronics 1080 of the edge-curing device, and the linear array of light-emitting elements 1020 to a controller, human-machine interface, and the like, of an edge-curing system such as edge-curing system 1400. Internal conduits 1070 may facilitate distribution of electrical wires and components longitudinally within the housing 1010 for making electrical connections along the entire length of the edge-curing device 1000. The conduits 1002 are shown extending from the posterior side of the edge-curing device 1000 towards a bottom direction, however, conduits 1002 may also extend from the posterior side of the edge-curing device 1000 towards a top direction.

The cylindrical lens 1040 and the linear array of light-emitting elements 1020 may be included within a housing 1010, comprising an anterior portion 1012 positioned toward a light-emitting side of the edge-curing device 1000 and a posterior portion 1015. The anterior portion 1012 may include top and bottom covers 1013 and 1014 which can be removably mounted or removably fastened by way of fasteners 1008. Fasteners 1008 may include screws, clamps, brackets, and other types of fasteners that can be removably fastened without damaging the housing 1010 and without repositioning the edge-curing device 1000 relative to a workpiece surface. Removable top and bottom covers 1013 and 1014 may include anterior lipped edges 1090 which span a length of the housing 1010 (and the length of the cylindrical lens 1040 and the length of the integrated aperture 1050) and overhang the top and bottom covers 1013 and 1014 in a widthwise direction towards each other. The lipped edges 1090 may overhang the top and bottom covers 1013 and 1014 relative to posterior mounting portion 1016 of the top and bottom covers 1013 and 1014. Furthermore, an interior surface 1018 of the top and bottom covers 1013 and 1014 may be shaped to snugly accommodate the cylindrical lens 1040 when the cylindrical lens 1040 and the top and bottom covers 1013 and 1014 are removably mounted to the housing 1010 of the edge-curing device 1000. In this way, the top and bottom covers 1013 and 1014 may be a lens holder for the cylindrical lens 1040. Further still, a cylindrical lens-facing surface 1042 of the linear array of light-emitting elements 1020 may be shaped (e.g. welled, grooved, and the like) to snugly contact and accommodate the incident face of the cylindrical lens 1040 along its length and width so that removably mounting the cylindrical lens 1040 in the housing 1010 includes snugly seating the cylindrical lens 1040 against the linear array of light-emitting elements, thereby longitudinally aligning the two components relative to each other, as described above.

The integrated aperture 1050 may be described as integrated with the housing 1010, because the integrated aperture 1050 may be formed directly adjacent to the emitting face 1044, and between the anterior lipped edges 1090 of the top and bottom covers 1013 and 1014 when the top and bottom covers are removably mounted to the housing 1010. The width 1060 of the integrated aperture 1050 may then be adjusted by designing the dimensions or amount of overhang of the lipped edges 1090, the amount of overhang increasing for reduced aperture widths 1060. For example, reducing the degree of overhang of the lipped edges 1090 may increase a gap therebetween, thereby increasing a width 1060 of the integrated aperture. Alternately, for a given cylindrical lens diameter and shape (e.g., rod, Fresnel, bi-convex, and the like) a set of top and bottom covers may be fabricated to yield a range of aperture widths. Consequently, an aperture width 1060 may be adjusted be removing a first set of top and bottom covers and replacing them with a second set of removably mountable top and bottom covers having different lipped edges 1090. In this way, both the cylindrical lens 1040 and the integrated aperture 1050 may be removably mounted, adjusted and/or selected in size and shape (e.g., as described with reference to FIGS. 8-9), in order to achieve a desired irradiance and beam width for light emitted from the edge-curing device at a surface of the work piece.

In some cases the overhang of the lipped edges 1090 may be symmetrical, while in other cases the overhang of the lipped edges 1090 may be unsymmetrical and the integrated aperture may be shifted off-center from the central axis 104. Shifting the aperture off-center (as well as shifting the lens-facing surface 1042 off-center) may allow for one or both of the cylindrical lens 1040 and the integrated aperture to be positioned off-center from the central axis 104, which may allow for angling the beam width emitted from the edge-curing device, relative to central axis 104, which can facilitate easier curing of workpieces in confined spaces.

Turning now to FIGS. 11A and 11B, they illustrate emission spectra 1100 and 500 corresponding to edge-curing devices 1102 and 502 without and with an integrated aperture, respectively. In particular, edge-curing device 1102 may be identical to the edge-curing device 502, except edge-curing device 1102 does not include an integrated aperture 550. In other words, light passing through the cylindrical lens 540 of edge-curing device 1102 may be emitted from the emitting face 1144 of the edge-curing device. Although the cylindrical lens 540 aids in focusing a portion of the emitted light centered more proximally about central axis 104 (e.g., within bounds 1108), the beam width delineated by bounds 1108 are broader at corresponding working distances in the z-direction from the edge-curing device 1102 (in the absence of the integrated aperture 550) as compared with the beam width delineated by bounds 508 for emitted light from the edge-curing device 502 including both the cylindrical lens 540 and the integrated aperture 550. Furthermore, owing to the absence of the integrated aperture 550, additional emitted light is scattered more broadly (as delineated by bounds 1112) from the emitting face 1144 of the edge-curing device 1102. Accordingly by including the integrated aperture 550 having an aperture width less than a diameter of the cylindrical lens, a narrower beam width may be emitted from an edge-curing device that can provide edge-curing of workpieces while reducing over-curing of surfaces outside of a target narrower beam width.

Turning now to FIG. 12 it illustrates a flow chart for a method 1200 of edge-curing a work piece. Some of the steps illustrated in FIG. 12 may be executed as instructions on board a computer controller of an edge-curing system such as controller 1414 of edge-curing system 1400. Method 1200 may begin at 1210 where operating conditions such as a desired beam width, working distance between an edge-curing device and a surface of a work piece to be edge-cured, desired irradiance at the work piece, and the like are determined. At 1220, method 1200 continues where the linear array of light-emitting elements is positioned within a housing of an edge-curing device. In one example, the linear array of light-emitting elements may include a high aspect ratio one-dimensional or two-dimensional array of light-emitting elements, and may further include an edge-weighted array of light-emitting elements, as discussed with reference to FIG. 13. Next, at 1230 and 1240, method 1200 continues by selecting a cylindrical lens size and an aperture width corresponding to desired operational parameters such as irradiance and beam width. For example, the cylindrical lens size and aperture width may be selected based on predetermined relationships such as the plots 800 and 900. Furthermore, the type of cylindrical lens (e.g., Fresnel lens, rod lens, bi-convex, plano-convex, and the like) may be selected based on the desired irradiance and beam width. Further still, the size of the cylindrical lens may be selected to conform to the configuration of the edge-curing system; for example, in very confined edge-curing systems, smaller cylindrical lenses may be utilized. As described above, selecting an aperture width may include selecting top and bottom covers 1013 and 1014 of an anterior portion 1012 of housing 1010. The top and bottom covers 1013 and 1014 include longitudinal lipped edges 1090 having appropriately sized overhangs such that they form the integrated aperture (having the desired aperture width) when the top and bottom covers 1013 and 1014 are removably mounted to the housing 1010. Thus step 1240 may further include removably mounting the integrated aperture in the housing. Similarly, step 1230 may further include removably mounting the selected cylindrical lens in the housing. The selected cylindrical lens may be positioned between the linear array of light-emitting elements and the integrated aperture. Furthermore, removably mounting the cylindrical lens in the housing may include snugly seating the cylindrical lens in an external surface of the linear array of light-emitting elements (or a window thereof) conforming to an incident face of the cylindrical lens. In this way an alignment of the linear array of light-emitting elements relative to the cylindrical lens may be rigidly maintained during operation of the edge-curing system.

Next, at 1250, method 1200 continues by positioning the integrated aperture directly adjacent to an emitting face of the cylindrical lens. As described above, interior surfaces of the top and bottom covers 1013 and 1014 may be shaped to conform to an external surface of the cylindrical lens. As such removably mounting the top and bottom covers 1013 and 1014 to the housing automatically positions the integrated aperture directly adjacent to the emitting surface of the cylindrical lens, including without any gaps interposed between the cylindrical lens and the top and bottom covers 1013 and 1014. In other words, the cylindrical lens may be snugly seated by the removably mounted top and bottom covers 1013 and 1014. In this way an alignment of the integrated aperture relative to the cylindrical lens may be rigidly maintained during operation of the edge-curing system.

At 1260, method 1200 emits light from the linear array of light-emitting elements to an incident surface of the cylindrical lens positioned snugly against the conforming surface of the light-emitting elements. The emitted light may then be passed through the cylindrical lens, within which the light may be collimated and focused before being emitted from an emitting surface of the cylindrical lens. At 1270 light emitted from the emitting surface of the cylindrical lens may be further focused by the integrated aperture positioned directly adjacent to the emitting surface by the top and bottom covers 1013 and 1014 snugly seated thereat. The integrated aperture may be centered about a longitudinal plane passing through the central axis 104 of the edge-curing device and as such, the emitted light exiting from the integrated aperture may include a narrow beam width centered about this longitudinal plane on to a surface of the work piece.

Next, at 1280, the method 1200 may adjust the beam width and/or irradiance based on one or more criteria. For example, the beam width be increased responsive to the beam width being smaller than the dimension of an edge to be cured, or the beam width may be decreased responsive to the beam width being larger than the dimension of an edge to be cured. As another example, the beam width may be decreased responsive to over-curing of the workpiece outside of the bounds of the desired beam width. As a further example, a beam width and/or irradiance may be adjusted to increase or decrease a rate of curing at the work piece. In the case where the criteria indicate that the beam width and/or irradiance are to be adjusted, method 1200 may return to 1230. As described above, the beam width and/or irradiance may be adjusted by changing a size of the integrated aperture and/or a size of the cylindrical lens, which may include selecting a new cylindrical lens and/or integrated aperture size. Selecting the new cylindrical lens and/or the integrated aperture size may include removing the existing removably mountable cylindrical lens and/or integrated aperture at 1288 without repositioning the edge-curing device, and removably mounting the new removably mountable cylindrical lens and/or integrated aperture to achieve the desired beam width and/or irradiance at 1230 and 1240.

In this manner, an edge-curing device may comprise a cylindrical lens, a linear array of light-emitting elements, and an integrated aperture, each aligned symmetrically in a housing about a longitudinal plane. The cylindrical lens may be positioned between the linear array of light-emitting elements and the integrated aperture. Furthermore, the integrated aperture may span the length of the cylindrical lens and may be positioned directly adjacent to an emitting face of the cylindrical lens. Further still, light emitted from the linear array of light-emitting elements and passing through the cylindrical lens may be emitted from the emitting face and focused by the aperture within a beam width centered about the longitudinal plane. In one example, light emitted from the cylindrical lens may be focused by the integrated aperture within the beam width at a working distance greater than a focal length of the lens. Furthermore, light emitted from the cylindrical lens would diverge beyond the beam width in the absence of the integrated aperture. In another example, the cylindrical lens may include a lens having a cylindrical power axis and an orthogonal plano axis. Furthermore, the cylindrical lens may include one of a cylindrical lens, semi-circular lens, a plano-convex lens, a bi-convex lens, or a faceted Fresnel lens. Moreover, the linear array of light-emitting elements may be positioned at a back focal length away from the cylindrical lens. In another example, the linear array of light-emitting elements may include an edge-weighted linear array of light-emitting elements.

In this manner, a method of edge curing a workpiece can comprise aligning longitudinal axes of each of a linear array of light-emitting elements, a cylindrical lens, and an integrated aperture on a longitudinal plane, receiving light from the linear array of light-emitting elements at an incident face of the cylindrical lens, positioning the integrated aperture directly adjacent to an emitting face of the cylindrical lens wherein light received at the incident face is collimated by the cylindrical lens and emitted at the emitting face, and focusing the emitted light by the integrated aperture within a beam width centered about the longitudinal plane on to the workpiece positioned along the longitudinal plane at a working distance from the emitting face. In one example, the beam width may correspond to a full width at half maximum (FWHM) beam width at the working distance. In another example, aligning each of the linear array of light-emitting elements, the cylindrical lens, and the integrated aperture symmetrically about the longitudinal plane may comprise mounting each of the linear array of light-emitting elements, the cylindrical lens, and the aperture in a housing. Furthermore, the cylindrical lens may be interposed between the linear array of light-emitting elements and the integrated aperture. In yet another example, mounting the integrated aperture in the housing may comprise removably mounting the integrated aperture in the housing so that the aperture is positioned adjacently to the emitting face of the cylindrical lens. The method may further include increasing the beam width by increasing an integrated aperture width, and decreasing the beam width by decreasing the integrated aperture width. Furthermore, increasing the integrated aperture width may comprise replacing the aperture with another removably mountable aperture having the increased integrated aperture width, and decreasing the aperture width may comprise replacing the integrated aperture with another removably mountable integrated aperture having the decreased integrated aperture width. In another example, the method may comprise increasing the beam width by decreasing a diameter of the cylindrical lens.

In this manner, an edge-curing system, may comprise a housing, including a linear array of light-emitting elements, a cylindrical lens, and an integrated aperture mounted therein. The cylindrical lens may be positioned between the linear array of light-emitting elements and the integrated aperture, and a length of each of the linear array of light-emitting elements, the integrated aperture, and the cylindrical lens may be symmetrically aligned about a longitudinal plane. Furthermore, the integrated aperture may span the length of the cylindrical lens and the length of the light-emitting elements, and may be positioned directly adjacent to an emitting face of the cylindrical lens. Further still, light emitted from the linear array of light-emitting elements and passing through the cylindrical lens may be emitted from the emitting face and focused by the integrated aperture within a beam width centered about the longitudinal plane. In one example, the housing may include a lens holder positioned at a light-emitting side of the housing, the lens holder having a top cover and a bottom cover, each of the top and bottom covers having lipped longitudinal edges that face inwardly towards each other when removably mounted to the housing on opposite sides of the longitudinal plane. In another example, an integrated aperture width may be less than a diameter of the cylindrical lens. In yet another example, an interior surface of the lipped longitudinal edges that faces the cylindrical lens may be shaped to snugly accommodate the external surface of the cylindrical lens without gaps, the lipped edges thereby fixing a position of the cylindrical lens when removably mounted to the housing.

Moreover, the cylindrical lens may be snugly seated without gaps within a grooved surface on the emitting side of the linear array of light-emitting elements, thereby aligning the longitudinal axis of the cylindrical lens symmetrically about the longitudinal plane. Furthermore, the top cover and the bottom cover may be identical in shape and dimension.

In this manner, the technical result of emitting narrow beam width radiation for edge-curing a work piece comprising a narrow beam width target region while reducing over curing of the work piece outside of the narrow width region may be achieved. Furthermore, in some embodiments, the aperture may be removably mounted to the housing, thereby facilitating retrofitting of existing lighting devices. Further still, removably mounting the aperture to the housing can enable adjustment of the aperture size of the edge-curing device, making the edge-curing device more flexibly adaptable to various edge-curing applications.

Note that the example control and estimation routines included herein can be used with various lighting sources and lighting system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to various Lambertian or near-Lambertian light sources. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An edge-curing device, comprising:
a cylindrical lens, a linear array of Lambertian light-emitting elements, and an integrated aperture, each aligned symmetrically in a housing about a longitudinal plane, wherein,
the cylindrical lens is positioned between the linear array of Lambertian light-emitting elements and the integrated aperture,
the integrated aperture is integrated into the housing, spans a length of the cylindrical lens, and is positioned directly adjacent to an emitting face of the cylindrical lens, an interior surface of the housing contacting the emitting face of the cylindrical lens and forming boundary surfaces,
light emitted from the linear array of Lambertian light-emitting elements and passing through the cylindrical lens is emitted from the emitting face and focused by the integrated aperture within a beam width centered about the longitudinal plane, and
the boundary surfaces and the integrated aperture focus light emitted from the cylindrical lens within the beam width at a working distance greater than a focal length of the cylindrical lens.

2. The lighting device of claim 1, wherein the light emitted from the cylindrical lens would diverge beyond the beam width in the absence of the integrated aperture.

3. The lighting device of claim 2, wherein the cylindrical lens comprises a lens having a cylindrical power axis and an orthogonal plano axis.

4. The lighting device of claim 3, wherein the cylindrical lens comprises one of a cylindrical lens, a semi-circular lens, a plano-convex lens, a bi-convex lens, or a faceted Fresnel lens.

5. The lighting device of claim 4, wherein the linear array of Lambertian light-emitting elements is positioned at a back focal length away from the cylindrical lens.

6. The lighting device of claim 5, wherein the linear array of Lambertian light-emitting elements comprises an edge-weighted linear array of Lambertian light-emitting elements.

7. A method of edge curing a workpiece, comprising:
aligning longitudinal axes of each of a linear array of Lambertian light-emitting elements, a cylindrical lens, and an integrated aperture integrated into a housing on a longitudinal plane, an interior surface of the housing in contact with an emitting face of the cylindrical lens and forming boundary surfaces,
receiving light from the linear array of Lambertian light-emitting elements at an incident face of the cylindrical lens, positioning the integrated aperture directly adjacent to the emitting face of the cylindrical lens wherein the light received at the incident face is collimated by the cylindrical lens and emitted at the emitting face, and focusing the emitted light by the boundary surfaces and the integrated aperture narrowing the emitted light to be within a beam width centered about the longitudinal plane on to the workpiece positioned along the longitudinal plane at a working distance from the emitting face that is greater than a focal length of the cylindrical lens.

8. The method of claim 7, wherein the beam width corresponds to a full width at half maximum (FWHM) beam width at the working distance.

9. The method of claim 8, wherein aligning each of the linear array of Lambertian light-emitting elements, the cylindrical lens, and the integrated aperture symmetrically about the longitudinal plane comprises mounting each of the linear array of Lambertian light-emitting elements, the cylindrical lens, and the aperture in the housing, wherein the cylindrical lens is interposed between the linear array of Lambertian light-emitting elements and the integrated aperture.

10. The method of claim 9, wherein mounting the integrated aperture in the housing comprises removably mounting the integrated aperture in the housing so that the integrated aperture is positioned adjacently to the emitting face of the cylindrical lens.

11. The method of claim 10, further comprising increasing the beam width by increasing an integrated aperture width, and decreasing the beam width by decreasing the integrated aperture width.

12. The method of claim 11, wherein increasing the integrated aperture width comprises replacing the integrated aperture with another removably mountable aperture having the increased integrated aperture width, and decreasing the integrated aperture width comprises replacing the integrated aperture with another removably mountable integrated aperture having the decreased integrated aperture width.

13. The method of claim 7, further comprising a window positioned between the integrated aperture and the workpiece.

14. An edge-curing system, comprising a housing, including:

a linear array of LED or laser diode light-emitting elements, a cylindrical lens, and an integrated aperture mounted therein, wherein the cylindrical lens is positioned between the linear array of LED or laser diode light-emitting elements and the integrated aperture, a length of each of the linear array of LED or laser diode light-emitting elements, the integrated aperture, and the cylindrical lens are symmetrically aligned about a longitudinal plane, the integrated aperture spans the length of the cylindrical lens and the length of the LED or laser diode light-emitting elements, and is positioned directly adjacent to an emitting face of the cylindrical lens, and where the integrated aperture is integrated into the housing, an interior surface of the housing contacting the emitting face of the cylindrical lens and forming boundary surfaces, light emitted from the linear array of LED or laser diode light-emitting elements and passing through the cylindrical lens is emitted from the emitting face and focused by the integrated aperture within a beam width centered about the longitudinal plane, and light emitted from the cylindrical lens is focused by the integrated aperture and the boundary surfaces to be within the beam width at a working distance greater than a focal length of the cylindrical lens.

15. The edge-curing system of claim 14, wherein the housing includes a lens holder positioned at a light-emitting side of the housing, the lens holder having a top cover and a bottom cover, each of the top and bottom covers having lipped longitudinal edges that face inwardly towards each other when removably mounted to the housing on opposite sides of the longitudinal plane.

16. The edge-curing system of claim 15, wherein an integrated aperture width is less than a diameter of the cylindrical lens.

17. The edge-curing system of claim 16, wherein an interior surface of the lipped longitudinal edges that faces the cylindrical lens is shaped to snugly accommodate an external surface of the cylindrical lens without gaps, the lipped longitudinal edges thereby fixing a position of the cylindrical lens when removably mounted to the housing.

18. The edge-curing system of claim 17, wherein the cylindrical lens is snugly seated without gaps within a grooved surface on an emitting side of the linear array of LED or laser diode light-emitting elements, thereby aligning a longitudinal axis of the cylindrical lens symmetrically about the longitudinal plane.

19. The edge-curing system of claim 18, wherein the top cover and the bottom cover are identical in shape and dimension.

* * * * *